United States Patent
Yahata

(10) Patent No.: US 9,934,813 B2
(45) Date of Patent: Apr. 3, 2018

(54) METHOD OF PLAYING SYSTEM STREAM FILES WITH DIFFERENT RECORDING FORMATS

(71) Applicant: Panasonic Intellectual Property Corporation of America, Torrance, CA (US)

(72) Inventor: Hiroshi Yahata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 31 days.

(21) Appl. No.: 15/195,670

(22) Filed: Jun. 28, 2016

(65) Prior Publication Data
US 2016/0307593 A1 Oct. 20, 2016

Related U.S. Application Data

(63) Continuation of application No. PCT/JP2015/005808, filed on Nov. 20, 2015.
(Continued)

(30) Foreign Application Priority Data

Nov. 2, 2015 (JP) .................. 2015-216163

(51) Int. Cl.
- *G11B 20/00* (2006.01)
- *H04N 5/913* (2006.01)
- *H04N 5/85* (2006.01)

(52) U.S. Cl.
CPC ...... *G11B 20/00246* (2013.01); *G11B 20/005* (2013.01); *G11B 20/0042* (2013.01);
(Continued)

(58) Field of Classification Search
CPC ........ G11B 20/00246; G11B 20/00181; G11B 20/0042; G11B 20/005; G11B 20/00514;
(Continued)

(56) References Cited

U.S. PATENT DOCUMENTS

| 6,088,506 A | 7/2000 | Yoshio et al. |
| 2009/0161873 A1* | 6/2009 | Simard ................ H04L 63/061 380/277 |

(Continued)

FOREIGN PATENT DOCUMENTS

JP 9-282848 10/1997

OTHER PUBLICATIONS

International Search Report of PCT application No. PCT/JP2015/005808 dated Feb. 9, 2016.

*Primary Examiner* — Hung Dang
*Assistant Examiner* — Sunghyoun Park
(74) *Attorney, Agent, or Firm* — Greenblum & Bernstein, P.L.C.

(57) ABSTRACT

In a playback method of a playback device that plays a system stream file including encrypted video information, the system stream file includes a first segment in which is repeated a first data unit that can be decrypted using a first decryption key that the playback device has and a second data unit of the same data size as the first data unit but cannot be decrypted by the first decryption key, and a second segment which can all be decrypted using a second decryption key that differs from the first decryption key. The playback method reads the system stream file, and performs conversion processing to convert the system stream file that has been read out into a post-conversion system stream, in which the second data unit in the first segment in the system
(Continued)

stream file that has been read out is replaced with a plurality of continuous invalid packets, and outs the post-conversion system stream.

9 Claims, 37 Drawing Sheets

Related U.S. Application Data

(60) Provisional application No. 62/139,824, filed on Mar. 30, 2015.

(52) U.S. Cl.
CPC .. *G11B 20/00181* (2013.01); *G11B 20/00514* (2013.01); *H04N 5/85* (2013.01); *H04N 5/913* (2013.01); *H04N 2005/91364* (2013.01)

(58) Field of Classification Search
CPC . H04N 5/85; H04N 5/913; H04N 2005/91364
See application file for complete search history.

(56) References Cited

U.S. PATENT DOCUMENTS

| | | | |
|---|---|---|---|
| 2013/0124875 A1* | 5/2013 | Resch | G06F 11/1004 713/189 |
| 2016/0087944 A1* | 3/2016 | Downey | G06F 21/10 713/168 |
| 2016/0234011 A1* | 8/2016 | Bruno | H04L 9/065 |

* cited by examiner

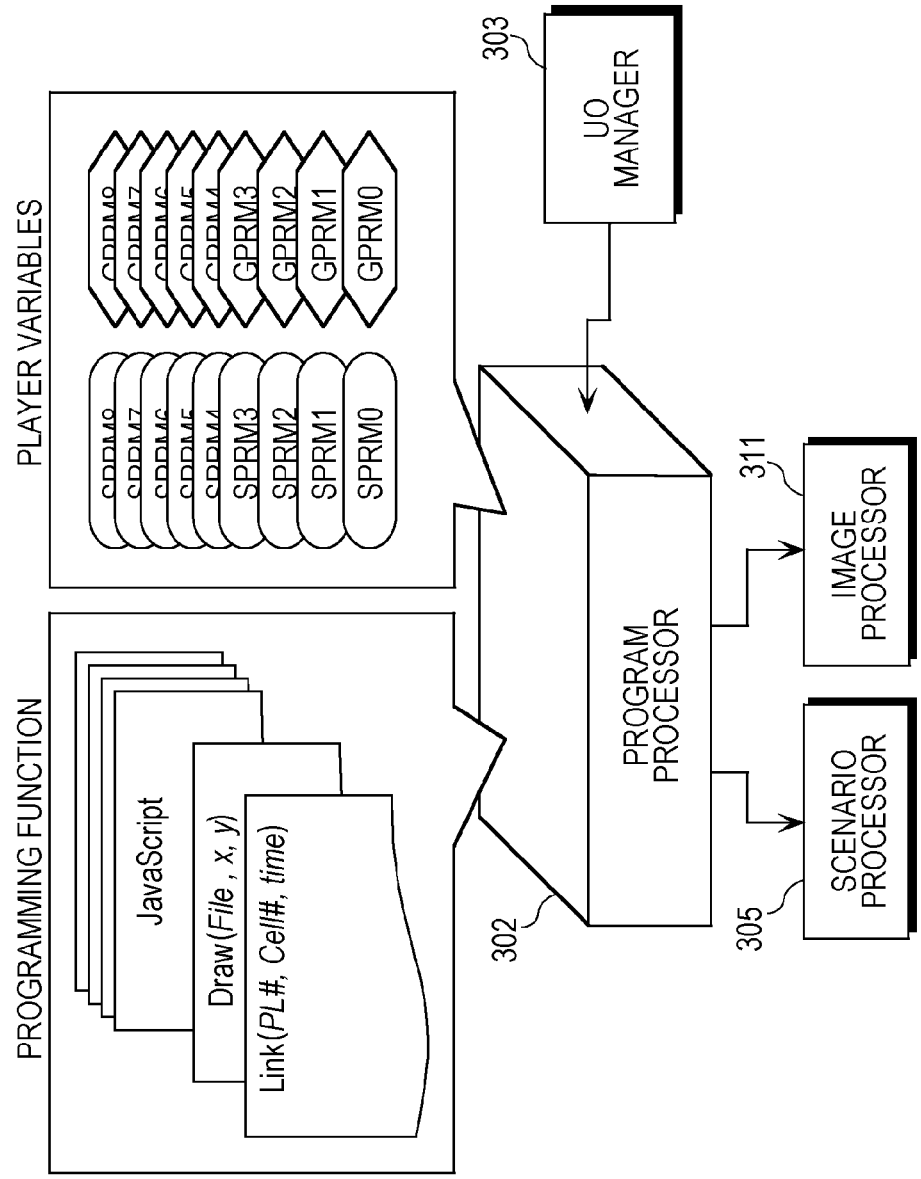

FIG. 24

| | | | | |
|---|---|---|---|---|
| 0 | Language Code | 11 | Player audio mixing mode for Karaoke | 22 | reserved |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

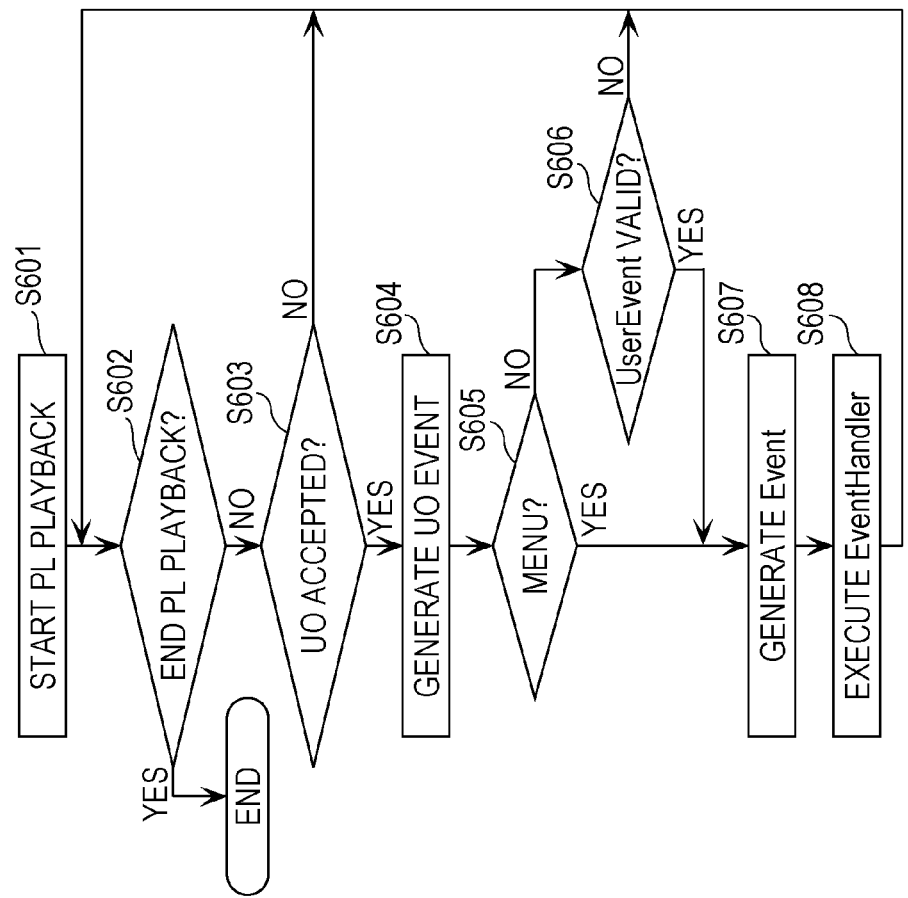
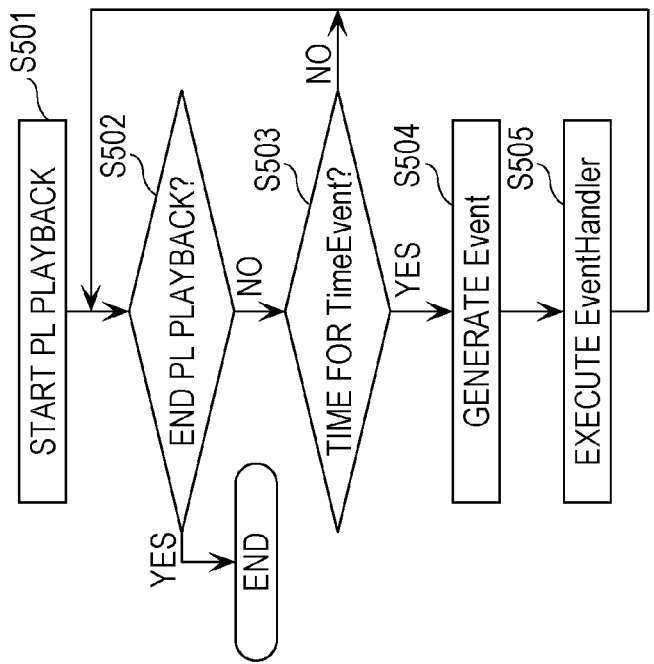

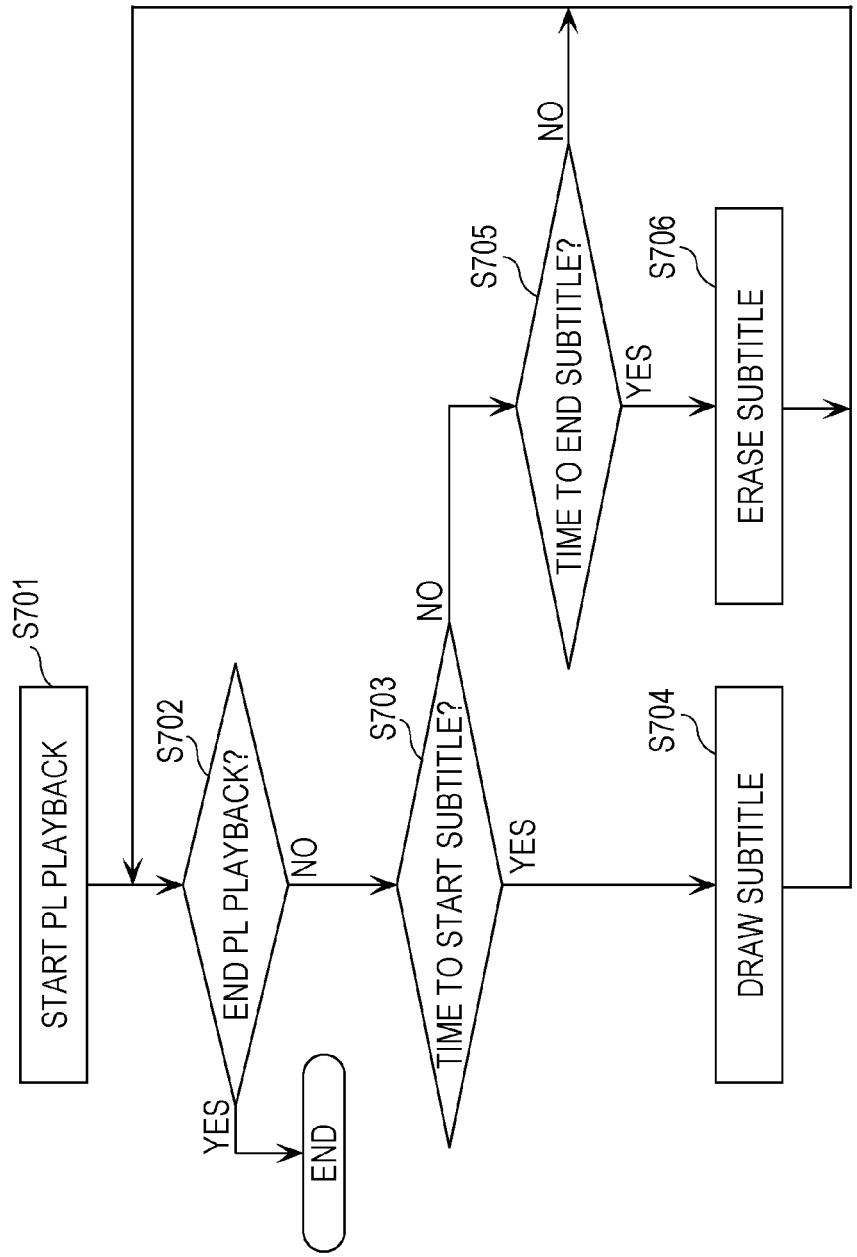

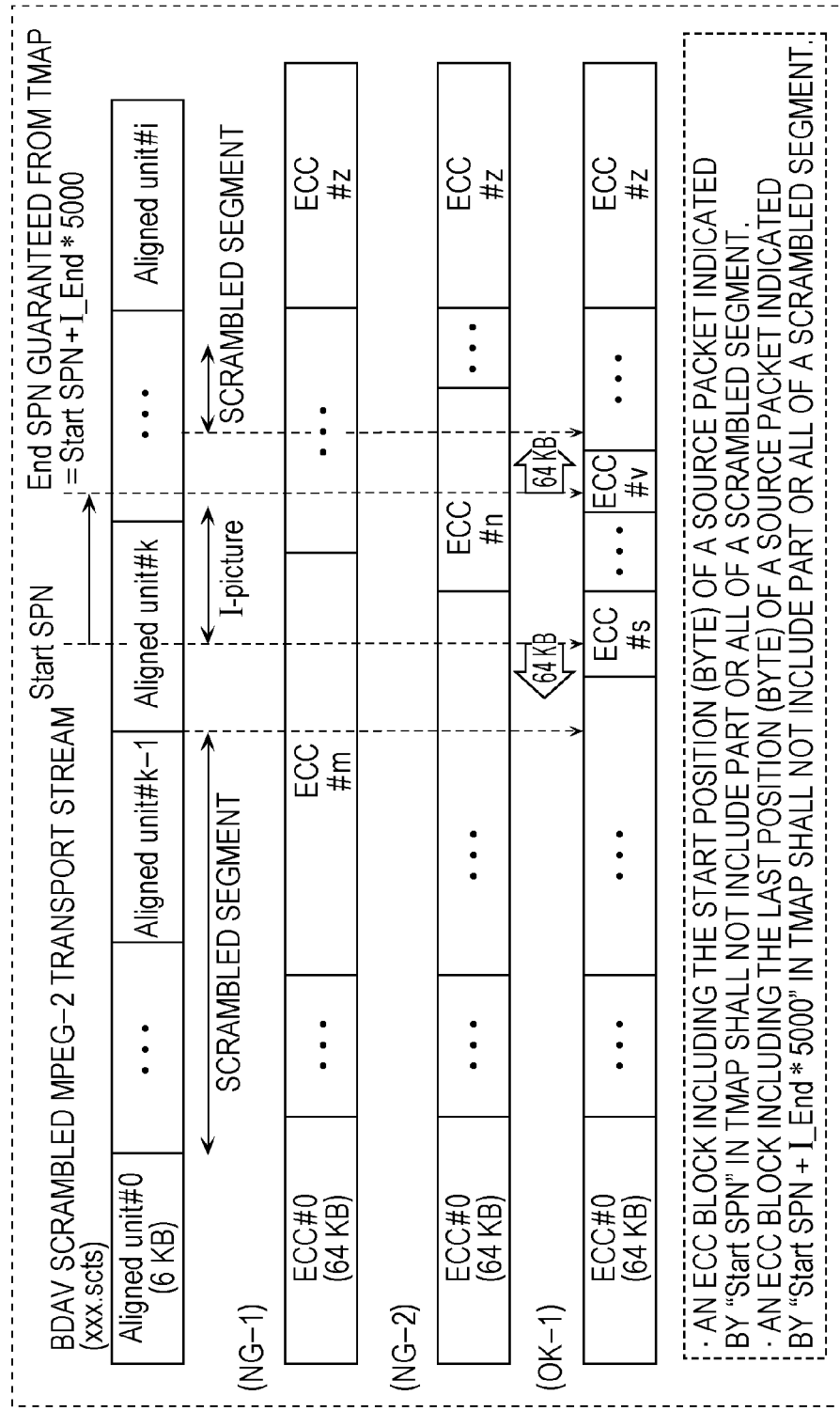

METHOD OF PLAYING SYSTEM STREAM FILES WITH DIFFERENT RECORDING FORMATS

BACKGROUND

1. Technical Field

The present disclosure relates to a playback method of playing a system stream file including encrypted video information and a playback device thereof, and a recording medium recording the system stream file.

2. Description of the Related Art

There conventionally has been disclosed technology relating to DVDs (e.g., see Japanese Unexamined Patent Application Publication No. 9-282848).

SUMMARY

However, the above Related Art has needed further improvement.

In one general aspect, the techniques disclosed here feature a playback method used by a first playback device that plays a system stream file including encrypted video information. The system stream file includes a first segment in which is repeated a first data unit that can be decrypted using a first decryption key that the first playback device individually has and a second data unit of the same data size as the first data unit but cannot be decrypted by the first decryption key, and a second segment which can be decrypted using a second decryption key that the first playback device has in common with a second playback device. The method includes: reading the system stream file; performing conversion processing to convert the system stream file that has been read out into a post-conversion system stream, in which the second data unit in the first segment in the system stream file that has been read out is replaced with a plurality of continuous invalid packets; and outputting the post-conversion system stream.

According to the above aspect, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 23 is a diagram for describing the functional configuration of a program processor;

FIG. 24 is a diagram illustrating a list of system parameters (SPRM);

FIGS. 29A and 29B are flowcharts illustrating the flow of processing relating to a time event in a BD-ROM player;

FIG. 30 is a flowchart illustrating the flow of processing subtitle data in a BD-ROM player;

FIG. 37 is a diagram for describing an additional embodiment in a case where the information recording medium is an optical disc.

DETAILED DESCRIPTION

Underlying Knowledge Forming Basis of the Present Invention

The present Inventors found that the following problem occurs relating to the recording media such as DVD and the like described in the "Background Art" section.

Most representative of information recording media recording video data is the DVD (hereinafter, may also be referred to as "Standard Definition" (SD-DVD). A conventional DVD will be described below.

Figure 1:
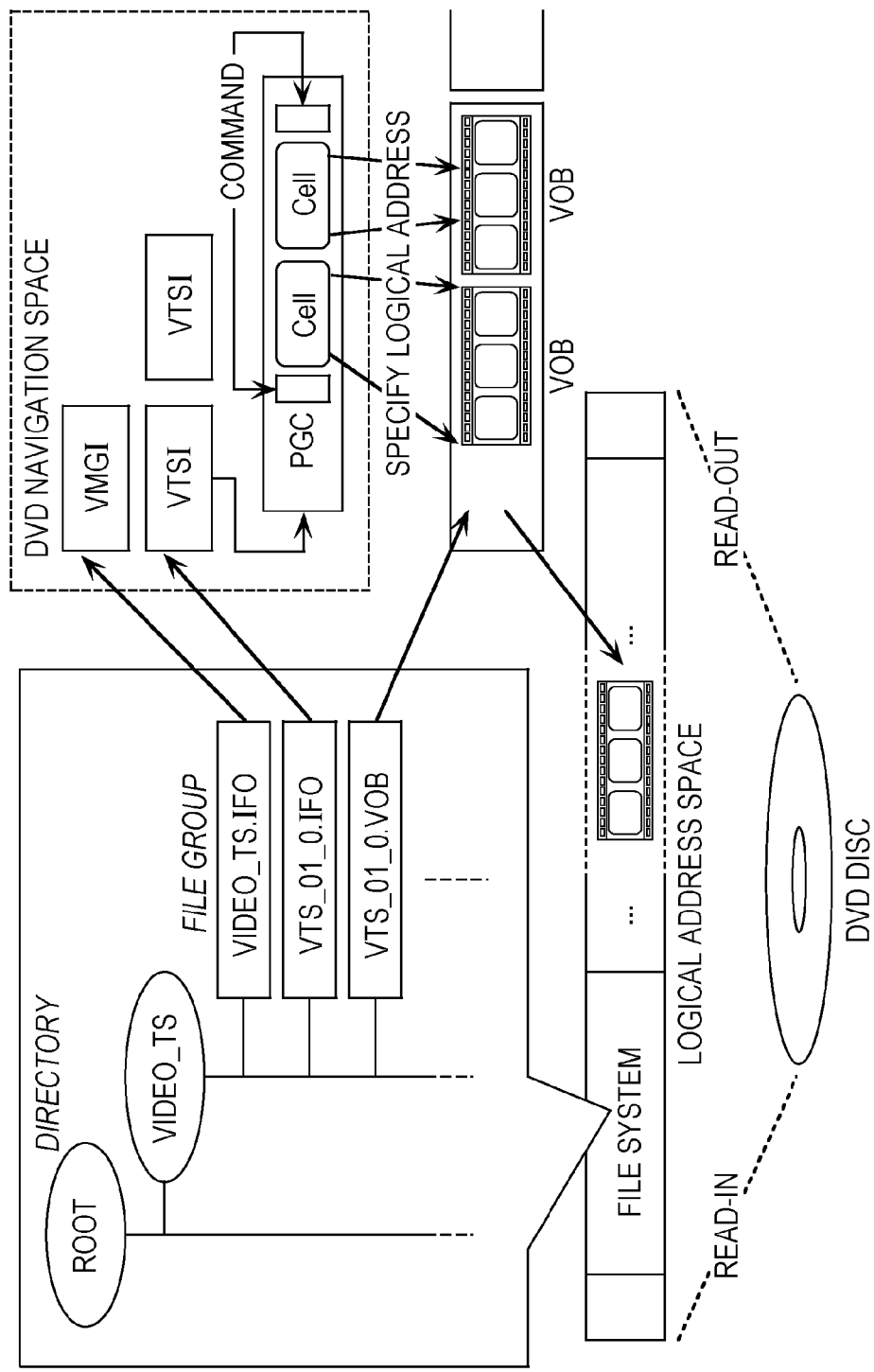
FIG. 1 is a diagram illustrating an SD-DVD structure.

FIG. 1 is a diagram illustrating the structure of an SD-DVD. As shown in the lower tier in FIG. 1, the DVD disc has a logical address space provided between a read-in and a read-out. Volume information of a file system is recorded from the beginning of the logical address space, and after that is recorded application data such as video, audio, and so forth.

The file system is an arrangement for managing data, that is stipulated by Standards such as ISO9660, Universal Disc Format (UDF), and so forth, and is an arrangement to express data on the disc in increments called directories or files.

There are file systems called File Allocation Tables (FAT) and NT File System (NTFS) in everyday-use personal computers (PC) as well, whereby data recorded in a hard disk are expressed on the computer as structures called directories or files, thereby improving usability.

In the case of an SD-DVD, both UDF and ISO9660 file systems are used. The two together are also referred to as "UDF bridge". The recorded data is arranged so that the data can be read out by a file system driver according to either UDF or ISO9660. Note that the DVD used here is a ROM disc for packaged media, to which writing is physically impossible.

Data recorded in the DVD can be viewed through the UDF bridge as directories or files such as illustrated to the upper left in FIG. 1. Immediately below the root directory ("ROOT" in FIG. 1) is placed a directory called "VIDEO_TS", and it is here that DVD application data is recorded. Application data is recorded as multiple files, primary files being the following types of files.

VIDEO_TS.IFO Disc play control information file
   VTS_01_0.IFO Video title set #1 play control information file
   VTS_01_0.VOB Video title set #1 stream file
   . . .

As shown in the above example, two suffixes are stipulated. "IFO" is a suffix indicating that the file has play control information recorded therein, and "VOB" is a suffix indicating that the file has an MPEG stream, which is AV data, recorded therein.

Play control information is information attached to the AV data, such as information to realize interactivity employed with the DVD (technology to dynamically change playing in response to user operations), metadata, and so forth. Play control information is also commonly referred to as navigation information regarding DVDs.

The play control information files include the "VIDEO_TS.IFO" that manages the entire disc, and the "VTS_01_0.IFO" that is play control information for individual video title sets. Note that multiple titles, in other words, multiple different movies and tunes, can be recorded in a single disc in the case of DVD.

Now, "01" in the file name body indicates the No. of the video title set, and in the case of the video title set #2, for example, this is "VTS_02_0.IFO".

The upper right portion in FIG. 1 is DVD navigation space in the application layer of the DVD, and is the logical structure space where the aforementioned play control information is loaded. Information within the "VIDEO_TS.IFO" is loaded in the DVD navigation space as VIDEO Manager Information (VMGI), as well as are "VTS_01_0.IFO" and play control information existing for each of other video title sets as Video Title Set Information (VTSI).

Described in the VTSI is Program Chain Information (PGCI) which is information of a play sequence called Program Chain (PGC). PGCI is made up of a set of Cells and a type of programming information called commands.

A Cell itself is information indicating a partial section or a whole section of a VOB (short for Video Object, and indicates an MPEG stream), and playing a Cell means to play the section of this VOB instructed by the Cell.

Commands are processed by a virtual machine of the DVD, and are close to Java (a registered trademark) Script and so forth executed in browsers to display Web pages, for example. However, while Java (registered trademark) Script performs window or browser control (e.g., opening a new browser window, etc.) besides logical operations, DVD commands differ in that they only execute playback control of AV titles, e.g., instructing a chapter to play or the like, for example, besides logical operations.

A Cell has the start and end addresses (logical addresses) of a VOB recorded in the disc as internal information thereof. A player reads out data using the start and end address information of the VOB described in the Cell, and executes playback.

Figure 2:
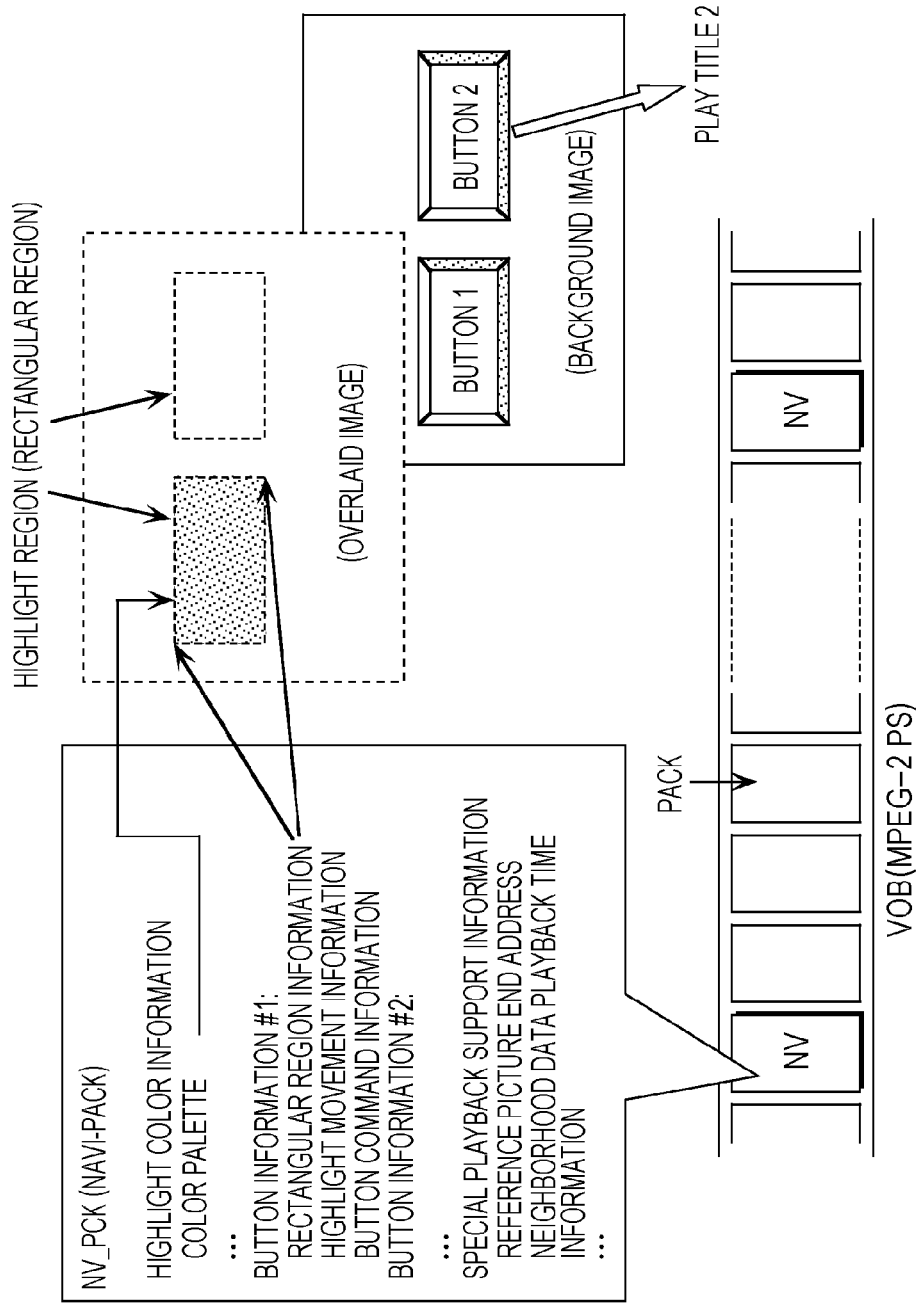
FIG. 2 is a schematic diagram for describing navigation information embedded in an MPEG stream, which is AV data.

FIG. 2 is an overview for describing navigation information embedded in an MPEG stream, which is AV data. Interactivity, which is a feature of the SD-DVD, is realized not only by the navigation information recorded in the aforementioned "VIDEO_TS.IFO" and "VTS_01_0.IFO" and so forth. Several important sets of information are multiplexed in the VOB along with video and audio data, using a dedicated carrier called navigation packs (called navi-pack or NV_PCK).

A menu screen will be described here as a simple example of interactivity. Several buttons are shown on the menu screen, with processing to be executed defined for each button when that button is selected.

One button is selected on the menu screen (a translucent color is overlaid on the selected button in highlight that button, indicating to the user that button is in a selected state), and the user can move the button in the selected state to any of the buttons above or below, to the left or to the right, using arrow keys on a remote controller.

Using the arrow keys of the remote controller to move the highlight to the button to be selected and executed, and okaying (pressing an OK key) executes the program of the corresponding command. Generally, playback of a corresponding title or chapter is executed by the command.

The upper left portion in FIG. 2 shows an overview of information stored in an NV_PCK. Highlight color information, information of individual buttons, and so forth, are included in the NV_PCK. Color palette information is described in the highlight color information, specifying the highlight translucent color to be displayed overlaid.

Described in the button information are rectangular region information which is the position information of each button, moving information from that button to other buttons (specification of destination buttons corresponding to each operation of the arrow keys by the user), and button command information (a command to be executed when that button is okayed).

The highlight on the menu screen is created as an overlaid image, as illustrated to the upper right portion in FIG. 2. The overlaid image is an object where rectangular region information of button information has been given color in color palette information. This overlaid image is composited with the background image illustrated at the right portion in FIG. 2, and displayed on the screen.

The menu screen of a DVD is realized as described above. The reason why part of the navigation data is embedded in the stream using an NV_PCK is as follows.

That is, to realize without problem processing where synchronization timing readily becomes problematic, such as dynamically updating menu information synchronously with the stream, for example, displaying a menu screen for just five to ten minutes partway through playing a movie.

Another major reason is to improve user operability, such as to store information for supporting special playback in an NV_PCK, so that AV data can be decoded and played smoothly during non-normal playback, such as fast-forward and fast-rewind while playing the DVD.

Figure 3:
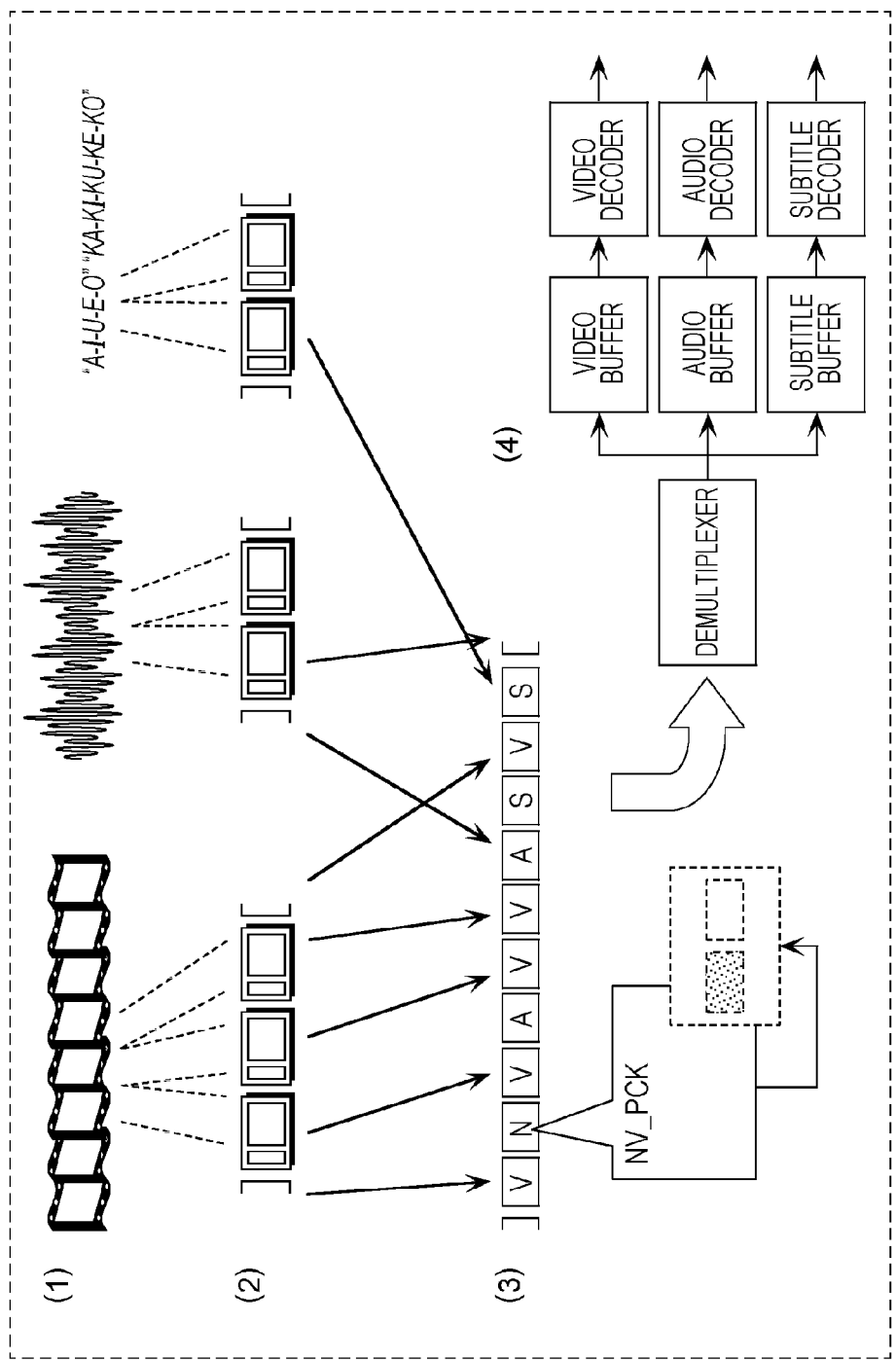
FIG. 3 is a schematic diagram illustrating a VOB structure in a DVD.

FIG. 3 is a schematic diagram illustrating the configuration of a VOB in a DVD. Data such as video, audio, and subtitles ((1) in FIG. 3) are packetized and packed according to the MPEG system (ISO/IEC13818-1) Standard ((2) in FIG. 3), and these are multiplexed to form a single MPEG program stream ((3) in FIG. 3), as illustrated in FIG. 3. The NV_PCKs including button commands for realizing interactivity are also multiplexed along with these, as described above.

A feature of multiplexing in the MPEG system is that the individual pixels of data that are multiplexed are in a bit string based on decoding order, but the bit string is not necessarily formed in playback order, that is to say decoding order, among the multiplexed data, i.e., among the video, audio, and subtitles.

This is due to a decoder model of the MPEG system stream ((4) in FIG. 3, generally referred to as System Target Decoder or STD) has decoder buffers corresponding to each elementary stream after demultiplexing, that temporarily stored the data until the decoding timing. These decoder buffers have different sizes according to each of the individual elementary streams, having 232 kB for video, 4 kB for audio, and 52 kB for subtitles.

Accordingly, the data input timing to each decoder buffer differs among the individual elementary streams, so there is discrepancy between the order of forming the bit string as the MPEG system stream, and the timing of displaying (decoding). That is to say, the subtitle data multiplexed along with the video data is not necessarily decoded at the same timing. Technology relating to DVDs such as described above is described in Japanese Unexamined Patent Application Publication No. 9-282848.

Now, in a large-capacity recording media such as a Blu-ray (registered trademark) Disc (BD)), there is a possibility that extremely high-definition video information can be stored. For example, it is conceivable that 4K (video information having resolution of 3840×2160 pixels) or HDR (high-luminance video information commonly called High Dynamic Range) or the like can be stored in a BD.

Encryption technology to identify playback devices that are sources of unauthorized leakage, to prevent such high-definition contents from being unauthorizedly used. However, the encryption technology is complicated so decryption processing is unnecessarily difficult and time-consuming. If the end result is that the behavior of the playback device is slowed or a marked cost increase ensues, this does not benefit the majority of well-doing consumers.

That is to say, there is a problem that encryption technology to prevent unauthorized use will only be detrimental to the majority of consumers unless it is introduced with a good balance between sufficient encryption strength, implementation load on the playback device, and decrease in response.

In light of the above studies, the Present Inventors studied the following improvement measures to solve the above problems.

According to a form of the present disclosure, in a playback method used by a first playback device that plays a system stream file including encrypted video information, the system stream file includes a first segment in which is repeated a first data unit that can be decrypted using a first decryption key that the first playback device individually has and a second data unit of the same data size as the first data unit but cannot be decrypted by the first decryption key, and a second segment which can be decrypted using a second decryption key that the first playback device has in common with a second playback device. The method includes reading the system stream file, performing conversion processing to convert the system stream file that has been read out into a post-conversion system stream, in which the second data unit in the first segment in the system stream file that has been read out is replaced with a plurality of continuous invalid packets, and outputting the post-conversion system stream.

According to this, a conventional decoder can be used without changing the design of the configuration thereof, even in a case of playing a system stream file with a different recording format in which a new encryption technology has been introduced, so implementation load and increase in cost of the player can be suppressed.

Also, for example, the second data unit may be configured of 32 source packets, and the 32 source packets configuring the second data unit may be replaced by 32 NULL packets, serving as the plurality of invalid packets, in the conversion processing.

According to this, 32 source packets are replaced with the same 32 NULL packets, so the positions of the multiple source packets configuration the first data unit that can be decrypted can be situated at the same positions before and after the conversion processing. Accordingly, playback of the first data unit can be performed without performing recalculation of address calculation, and processing load can be reduced.

Also, for example, the system stream file may be converted into an m2ts format system stream in the conversion by decrypting the first segment using the first decryption key and decrypting the second segment using the second decryption key.

Also, for example, the system stream file may have at least one of a first system stream file having the first segment and the second segment, and a second system stream file of the m2ts format. In the outputting, determination may be made regarding whether the system stream file is the first system stream file or the second system stream file, in accordance with whether or not the suffix of the system stream file indicates the m2ts format, an m2ts format system stream obtained by performing the conversion processing may be output in a case where the system stream file that has been read out is determined to be the first system stream file, and a system stream may be output without having performed the conversion processing in a case where the system stream file that has been read out is determined to be the second system stream file.

According to this, conversion processing is switched according to the suffixed of the system file stream, so switching can be performed easily.

Also, for example, the system stream file may be configured of a plurality of source packets. Each of the plurality of source packets may have a first timestamp indicating an input clock time to a system target decoder that the first playback device has, and a second timestamp indicating an input clock time to the system target decoder may be imparted to each of the plurality of invalid packets in the conversion.

According to this, time stamps are imparted to each of the multiple invalid packets substituted in the conversion processing, so the system stream file after conversion processing can be appropriated processed.

Also, for example, the second timestamp imparted to each of the plurality of invalid packets in the conversion processing may satisfy that a transfer rate at which the invalid packets are transferred is equal to or smaller than the maximum transfer rate of the system stream file.

Also, for example, in the conversion processing, the second timestamp imparted to the invalid packet that is the last of the plurality of invalid packets replaced in the one second data unit may satisfying a clock time earlier than the timestamp of a TS packet immediately following one second data unit by an amount of time necessary to transfer one TS packet at the maximum transfer rate of the system stream file.

Also, for example, the system stream file may configure audio visual (AV) data along with a management information file recording management information corresponding to the system stream file, the management information file may have a time map indicating a presentation clock time of an I-picture that is a random access point, all I-pictures regarding which the presentation clock time is indicated in the time map may be multiplexed in the second segment, and the system stream file may be converted into an m2ts format system stream in the outputting, by decrypting all of the I-pictures using the second decryption key.

According to this, all I-pictures serving as random access points are multiplexed in the second segment, so decryption can be performed using only the second decryption key. Accordingly, decryption of the I-picture does not necessitate processing to switch the decryption key for decryption of this I-picture, so delay in response at the time of special playback can be reduced.

According to a form of the present disclosure, in a non-transitory tangible recording medium in which is recorded AV data, the AV data has a system stream file including encrypted video information, and a management information file recording management information corresponding to the system stream file. The system stream file includes a first segment in which is repeated a first data unit that can be decrypted using a first decryption key that the playback device that plays the AV data recorded in the recording medium individually has and a second data unit of the same data size as the first data unit but cannot be decrypted by the first decryption key, and a second segment which can be decrypted using a second decryption key that the playback device has in common with another playback device. The management information file has a time map in which are correlated an I-picture serving as a random access point, and a presentation clock time of the I-picture, and the I-picture regarding which the presentation clock time is indicated in the time map is multiplexed in the second segment.

According to this, all I-pictures serving as random access points are multiplexed in the second segment, so the playback device can perform decryption using just the second decryption key. Accordingly, the decryption key does not hate to be switched in the processing for decryption of this I-picture, so delay in response at the time of special playback can be reduced.

Also, for example, in the time map, a start source packet No. may be correlated that identifies a start source packet out of the plurality of source packets storing the I-picture, and the start source packet identified by the start source packet No. may be situated in the second segment.

Also, for example, in the time map, end position information may be correlated that indicates, in a stepwise manner, the number of packets regarding which inclusion of a plurality of source packets storing the I-picture is guaranteed, which is the number of packets from the start source packet, and a segment from the start source packet to a source packet identified by the start source packet No. and the end position information may be situated in the second segment.

Also, for example, the system stream file may be recorded in the recording medium in predetermined data units read out by a playback device that plays the AV data recorded in the recording medium, and the predetermined data unit that including the start source packet identified by the start source packet No., and the predetermined data unit including a source packet identified by the start source packet No. and end position information may not include part or all of the first segment.

These general or specific aspects may be realized by a device, method, system, integrated circuit, computer program, or computer-readable recording medium such as a CD-ROM, and may be realized by any combination of a device, method, system, integrated circuit, computer program, and recording medium.

Preferred embodiments to carry out the present disclosure will be described below with reference to the attached drawings. It should be noted that the second embodiment is the closest to the disclosure of the present application; the basic configuration of the information recording medium and so forth in the second embodiment will be described first by way of the first embodiment, to facilitate understanding.

First Embodiment

First, the basic structure and operations of a BD-ROM and a BD-ROM player that plays BD-ROMs will be described with reference to FIGS. 1 through 30.

Logical Data Structure on Disc

Figure 4:
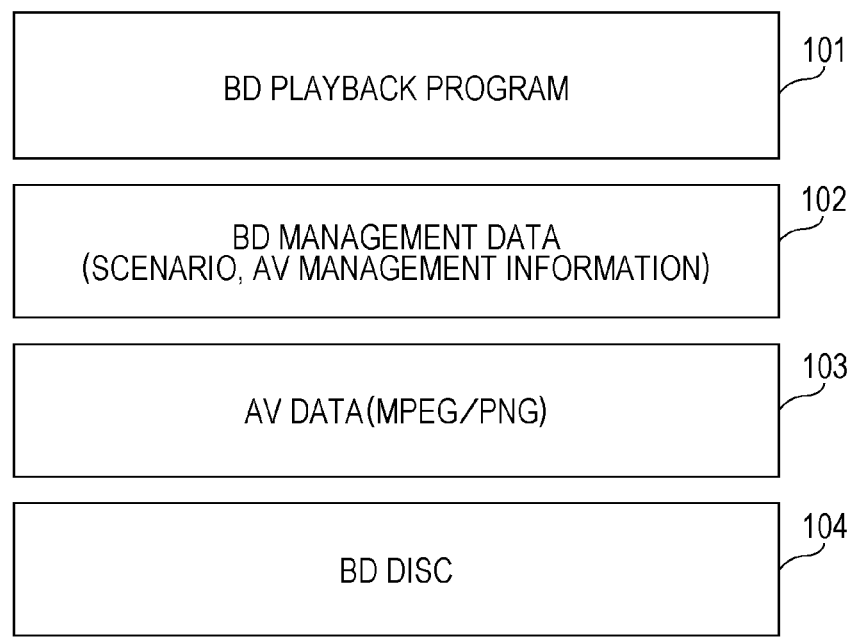
FIG. 4 is a diagram illustrating a data hierarchy of a BD-ROM.

FIG. 4 is a diagram illustrating data hierarchy on a BD-ROM. As illustrated in FIG. 4, there are recorded in a BD-ROM 104 that is a disc medium, AV data 103, BD management information 102 such as management information relating to the AV data, AV playback sequence, and so forth, and a BD playback program 101 that realizes interactivity.

Note that in the present embodiment, description of BD-ROM will be made primarily with regard to an AV application that plays AV contents such as movies, but a BD-ROM can be used as a recording medium for computer use, in the same way as with CR-ROMs and DVD-ROMs, as a matter of course.

Figure 5:
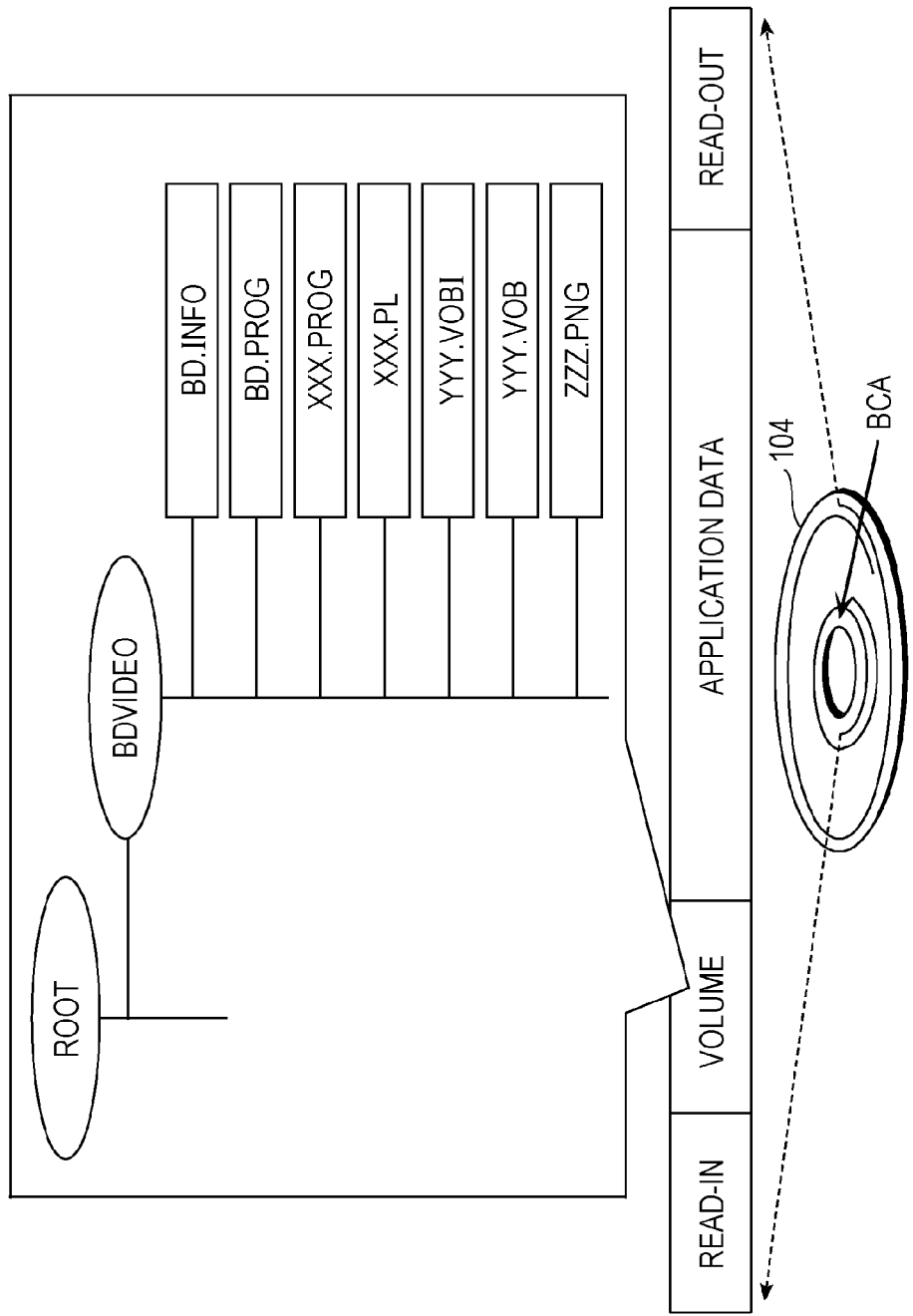
FIG. 5 is a diagram illustrating a structure of logical data recorded in a BD-ROM.

FIG. 5 is a diagram illustrating the structure of logical data recorded on the above BD-ROM 104. The BD-ROM 104 has a recording region in the form of a spiral from the inner perimeter thereof toward the outer perimeter, and has a logical address space where logical data can be recorded, between a read-in at the inner perimeter and a read-out at the outer perimeter, in the same way as with other optical discs, such as DVDs and CDs, for example.

On the inner side of the read-in there is a special region called a Burst Cutting Area (BCA), that can only be read out by the drive. This region is unreadable by applications, and accordingly is often used in copyright protection technology and so forth, for example.

Application data such as video data and the like is recorded the logical address space, with file system information (volume) at the beginning thereof. The file system is the arrangement for managing data stipulated by a standard such as UDF or ISO9660 or the like, as described above in the conventional art. Logical data recorded therein can be read out using the directory and file structure, in the same way as with a normal PC.

In the case of the present embodiment, the directory and file structure on the BD-ROM 104 has a BDVIDEO directory immediately below the root directory (ROOT). This directory is a directory in which data, such as AV data and management information handled by the BD-ROM (the BD playback program 101, BD management information 102, and AV data 103 illustrated in FIG. 4) is recorded. The following seven types of files are recorded beneath the BDVIDEO directory.

BD.INFO (Fixed Filename)

This is one of "BD management information", and is a file in which is recorded information relating to the entire BD-ROM. The BD-ROM player reads out this file first.

BD.PROG (Fixed Filename)

This is one of "BD playback programs", and is a file in which is recorded a program relating to the entire BD-ROM.

XXX.PL ("XXX" is Variable, Suffix "PL" is Fixed)

This is one of "BD management information", and is a file in which is recorded playlist (Play List) information that records a scenario. Each playlist has one file.

XXX.PROG ("XXX" is Variable, Suffix "PROG" is Fixed)

This is one of "BD playback programs", and is a file in which is recorded a program for each aforementioned playlist. The correlation to the playlist is identified by the file body name ("XXX" matches).

YYY.VOB ("YYY" is Variable, Suffix "VOB" is Fixed)

This is one of "AV data", and is a file in which is recorded a VOB (the same as the VOB described in the conventional example). One VOB corresponds to one file.

YYY.VOBI ("YYY" is Variable, Suffix "VOBI" is Fixed)

This is one of "BD management information", and is a file in which is recorded management information relating to the VOB which is AV data. The correlation to the VOB is identified by the file body name ("YYY" matches).

ZZZ.PNG ("ZZZ" is Variable, Suffix "PNG" is Fixed)

This is one of "AV data", and is an image file in PNG (an image format standardized by the World Wide Web Consortium (W3C) and is pronounced "ping") which is image data for configuring subtitles and menu screens. One PNG image corresponds to one file.

Player Configuration

Figure 6:
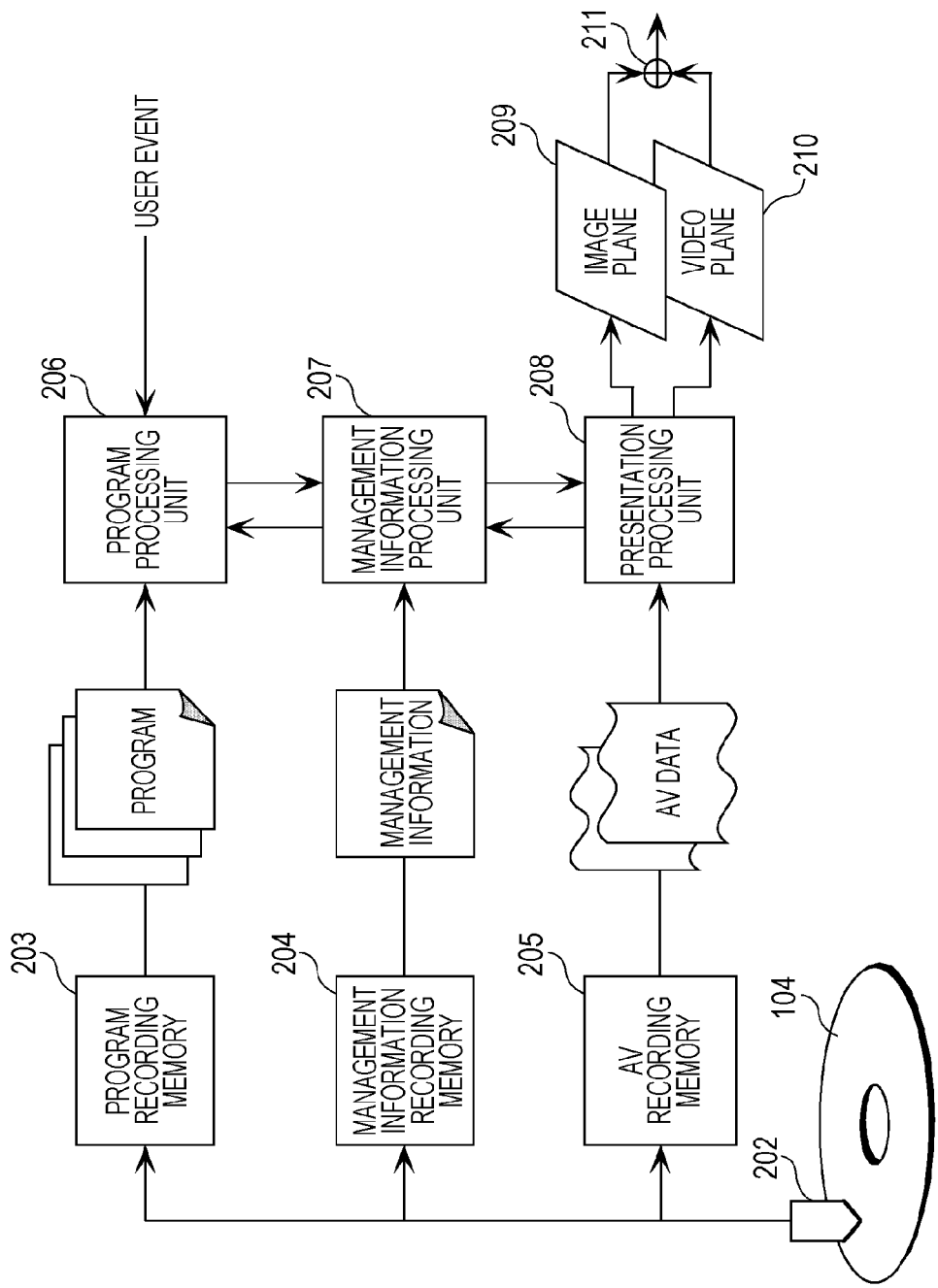
FIG. 6 is a diagram illustrating an overview of a basic configuration of a BD-ROM player that plays BD-ROMs.

Next, the configuration of a player that plays the BD-ROM 104 described above will be described with reference to FIGS. 6 and 7. FIG. 6 is a schematic diagram illustrating the basic configuration of a BD-ROM player that plays the BD-ROM 104.

The BD-ROM player illustrated in FIG. 6 reads out data on the BD-ROM 104 via an optical pickup 202. The data that is read out is stored in dedicated memory in accordance with the type of each data. The BD playback program ("BD.PROG" or "XXX.PROG" file) is recorded in program recording memory 203, the BD management information ("BD.INFO", "XXX.PL", or "YYY.VOBI" file) in management information recording memory 204, and AV data ("YYY.VOB" or "ZZZ.PNG" file) in AV recording memory 205, respectively.

The BD playback program recorded in the program recording memory 203 is processed by a program processing unit 206. The BD management information recorded in the management information recording memory 204 is processed by a management information processing unit 207. Also, the AV data recorded in the AV recording memory 205 is processed by a presentation processing unit 208.

The program processing unit 206 receives information of a playlist to be played from and event information such as the timing to execute a program from the management information processing unit 207, and performs processing of the program. The playlist to play can be dynamically changed at the program, and this can be realized by sending a play command of the playlist after changing to the management information processing unit 207.

The program processing unit 206 further accepts events from the user, such as requests from a remote controller that the user operates for example, and in a case where there is a program corresponding to the user event, executes the processing.

The management information processing unit 207 receives instructions from the program processing unit 206 and analyzes a playlist corresponding to that instruction and the management information of a VOB corresponding to that playlist. Further, playback instructions of AV data to be played are given to the presentation processing unit 208. The management information processing unit 207 also receives reference time information from the presentation processing unit 208, and performs stopping instruction of the AV data playback to the presentation processing unit 208 based on the time information. Further, an event is generated indicating the program executing timing as to the program processing unit 206.

The presentation processing unit 208 has decoders corresponding to each data of video, audio, and subtitles, and decodes and outputs AV data in accordance with instructions from the management information processing unit 207. The video data and subtitle data is drawn on respective dedicated planes after decoding.

Specifically, the video data is drawn on a video plane 210, and image data such as subtitle data is drawn on an image plane 209, further, compositing processing of the video drawn on the two planes is performed by a compositing processing unit 211 and output to a display device such as a TV or the like.

Figure 7:
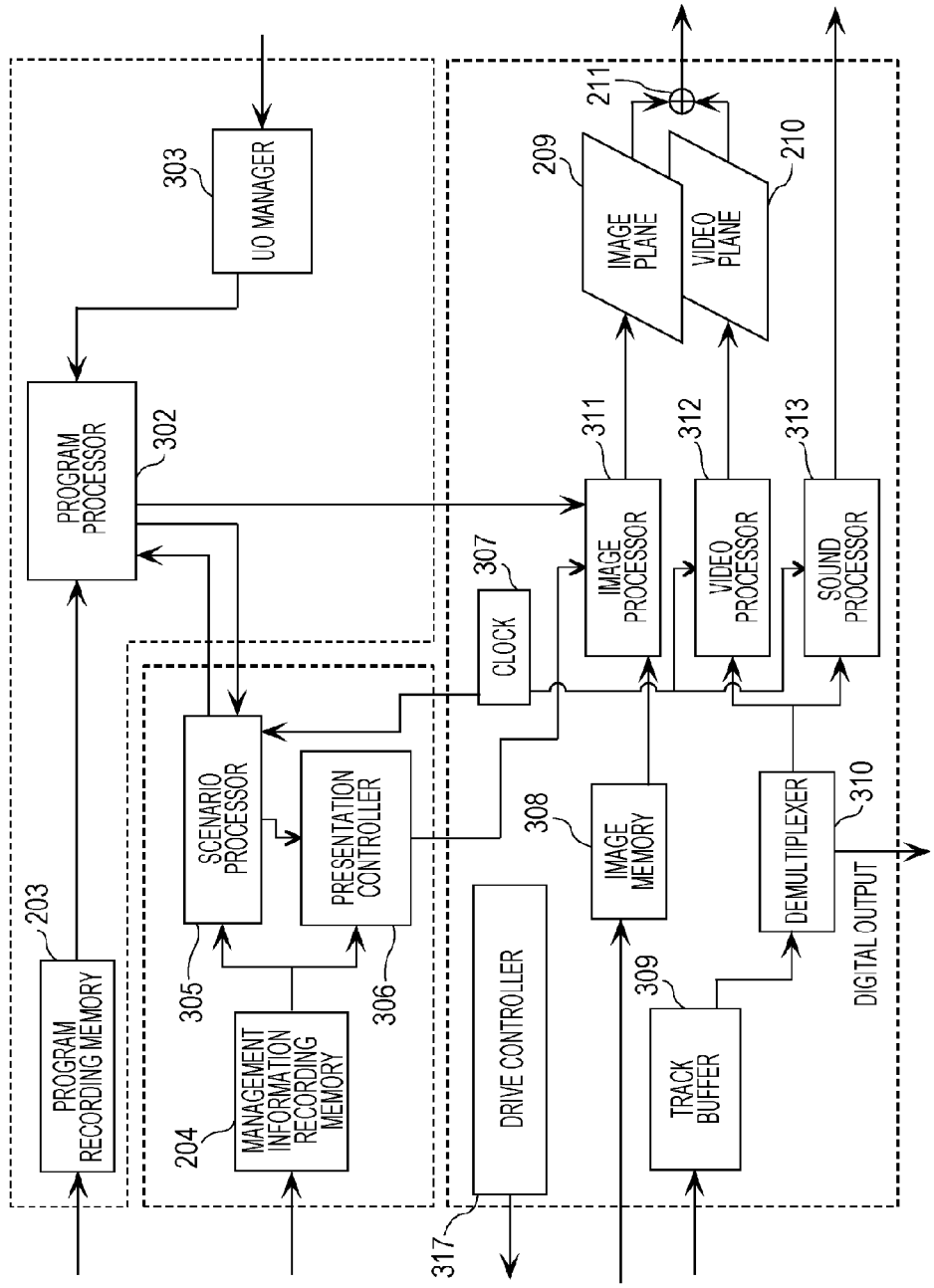
FIG. 7 is a block diagram where the configuration of the player illustrated in FIG. 6 is detailed.

The BD-ROM player has a configuration based on the data structure recorded in the BD-ROM 104 illustrated in FIG. 4, as illustrated in FIG. 6. FIG. 7 is a block diagram detailing the configuration of the player illustrated in FIG. 6. The correlation of the components illustrated in FIG. 6 and the components illustrated in FIG. 7 is as follows.

The AV recording memory 205 corresponds to image memory 308 and a track buffer 309. The program processing unit 206 corresponds to a program processor 302 and a UO (User Operation) manager 303. The management information processing unit 207 corresponds to a scenario processor 305 and a presentation controller 306. The presentation processing unit 208 corresponds to a clock 307, a demultiplexer 310, an image processor 311, a video processor 312, and a sound processor 313.

The VOB data (MPEG stream) read out from the BD-ROM 104 is recorded in the track buffer 309, and the image data (PNG) in the image memory 308, respectively.

The demultiplexer 310 extracts VOB data recorded in the track buffer 309, based on the time obtained from the clock 307. Further, video data included in the VOB data is sent to the video processor 312, and the audio data to the sound processor 313, respectively.

The video processor 312 and sound processor 313 each are configured including a decoder buffer and a decoder, as stipulated by the MPEG system standard. That is to say, the data of each of the video and audio sent from the demultiplexer 310 is temporarily recorded in the respective decoder buffers, and subjected to decoding processing at the respective decoders following the clock 307.

There are the following two processing methods for the PNG data recorded in the image memory 308. In a case where the PNG data is for subtitles, the decoding timing is instructed by the presentation controller 306. The scenario processor 305 first receives the time information from the clock 307, and instructs the presentation controller 306 to display or not display subtitles when the subtitle display time (starting and ending) arrives, so that appropriate subtitle display can be performed.

The image processor 311 which has received a decode/display instruction from the presentation controller 306 extracts the corresponding PNG data from the image memory 308, decodes, and draws on the image plane 209.

Also, in a case where the PNG data is for a menu screen, the decoding timing is instructed by the program processor 302. When the program processor 302 instructs decoding of the image is dependent on the BD program that the program processor 302 is processing, and accordingly is not always the same.

The image data and video data is drawn on the image plane 209 and video plane 210 after the respective decoding described in FIG. 6, and composited and output by the compositing processing unit 211.

The management information read out from the BD-ROM 104 (scenario and AV management information) is recorded in the management information recording memory 204, but the scenario information ("BD.INFO" and "XXX.PL") is read out and processed by the scenario processor 305. Also, the AV management information ("YYY.VOBI") is read out and processed by the presentation controller 306.

The scenario processor 305 analyzes the playlist information, instructs the presentation controller 306 of the VOB referenced by the playlist and the playback position thereof. The presentation controller 306 analyzes the management information ("YYY.VOBI") of the VOB to be handled, and instructs a drive controller 317 to read out the VOB to be handled.

The drive controller 317 follows the instructions of the presentation controller 306 to move the optical pickup 202, and read out the AV data to e handled. The AV data that has been read out is recorded in the image memory 308 or track buffer 309, as described earlier.

The scenario processor 305 monitors the time of the clock 307, and hands the event to the program processor 302 at the timing set in the management information.

The BD program recorded in the program recording memory 203 ("BD.PROG" or "XXX.PROG") is executed by the program processor 302. The program processor 302 processes a BD program in a case where an event has been sent from the scenario processor 305 or a case where an event has been sent from the UO manager 303.

In a case where a request has been sent from the user by a remote controller key, the UO manager 303 generates an event corresponding to this request, and sends to the program processor 302. Playback of a BD-ROM is performed by the operations of the components in this way.

Application Space

Figure 8:
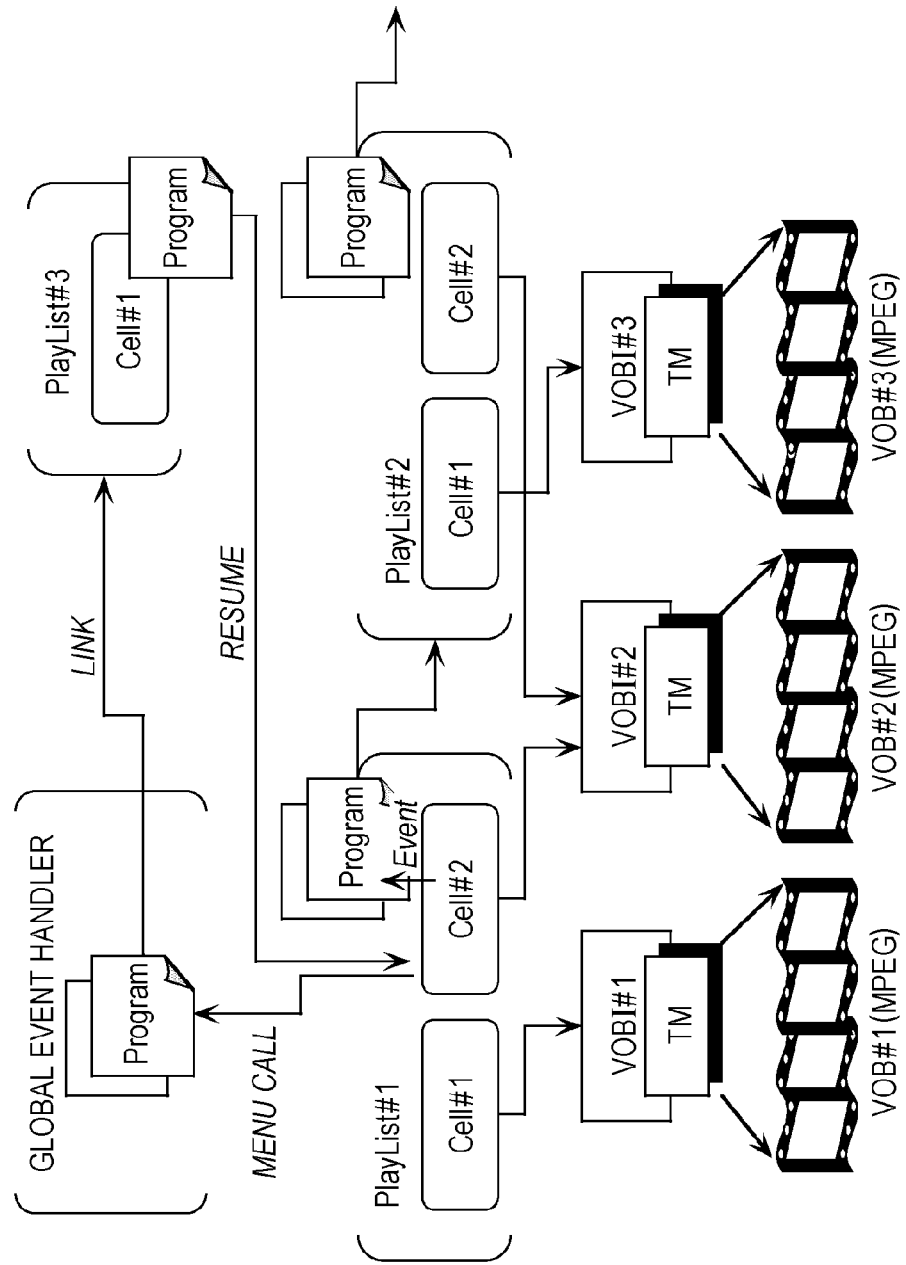
FIG. 8 is a diagram illustrating application space of a BD-ROM.

FIG. 8 is a diagram illustrating application space of a BD-ROM. In the application space of a BD-ROM, a playlist (PlayList) is one playback unit. A playlist has a static scenario that is made up of a playback sequence of cells (Cell), and a dynamic scenario described by a program.

As long as there is no dynamic scenario according to a program, the playlist is simply playing the individual cells in order, and playback of the playlist ends at the point that playback of all cells has ended. On the other hand, a program is capable of describing playback beyond the playlist, and dynamically changing the object of playback in accordion with user selections or the state of the player. A typical example is dynamic change of the object of playback made via the menus screen. In the case of a BD-ROM, a menu is a scenario played by user selection, i.e., one component of a function to dynamically select a playlist.

The term program as used here means an event handler executed by a time-based event or a user event. A time-based event is an event generated based on time information embedded in the playlist. An event sent from the scenario processor 305 to the program processor 302 as described in FIG. 7 corresponds to this. Upon a time-based event being issued, the program processor 302 process execution of an event handler correlated by ID.

As described earlier, a program to be executed may instruct playback of another playlist, and in this case, the playback of the playlist currently being played is canceled, and transitions to playback of the specified playlist.

A user event is an event generated by operations of remote controller keys by the user. There are two general types of user events. A first is an event of selecting a menu generated by operations of cursor keys ("up", "down", "left", and "right" keys) and an "OK" key that the remote controller has.

The event handler corresponding to the event of menu selection is only valid for restricted time within the playlist. That is to say, validity periods are set for each of the event handles, as playlist information. The program processor 302 searches for a valid event handler when an "up", "down", "left", "right", or "OK" key of the remote controller has been pressed, and in a case where there is a valid event handler, the event handler is executed. Otherwise, the event of menu selection is ignored.

The second user event is an event for calling up a menu screen generated by operation of a "menu" key. Upon a menu screen call-up event being generated, a global event handler is called.

A global event handler is an event handler that is not dependent on any playlist, and is constantly valid. Using this function enables a DVD menu call to be implemented. Implementing a menu call enables audio and subtitle menus and so forth to be called up during playback of a title, and to execute playback of the title from the paused point, after the audio or subtitles has been changed.

A cell (Cell), which is a unit making up a static scenario in the playlist, is a reference to all or part of a playback section of a VOB (MPEG stream). A cell has information of starting and ending time of the playback section within the VOB. VOB management information (VOBI), that is paired with each VOB, has a time map (Time Map or TM) therein, and can find the readout start address and end address for the playback and end time of the VOB within the VOB (i.e., within the object file "YYY.VOB") described by this time map. Details of the time map will be described later with reference to FIG. 14.

Details of VOB

Figure 9:
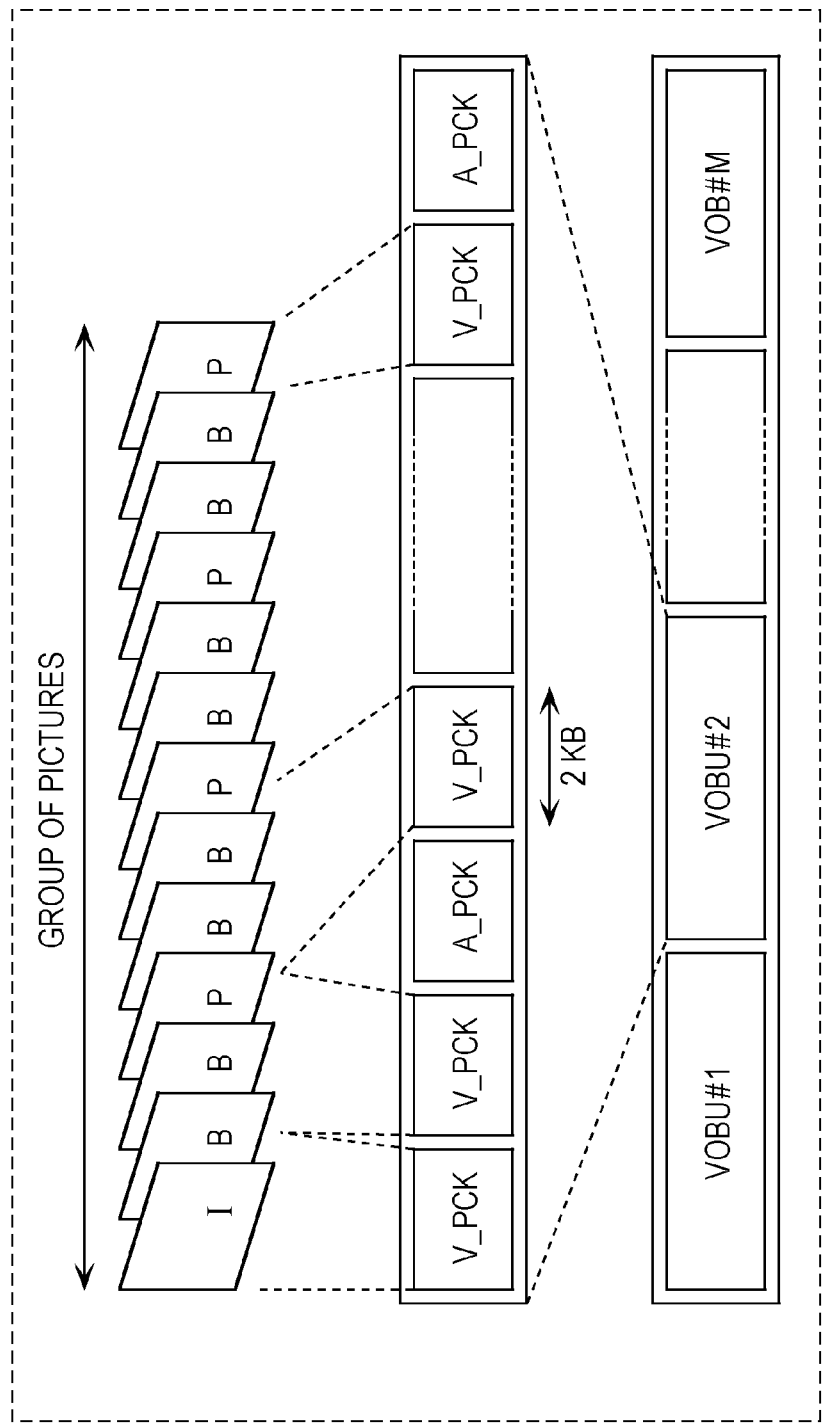
FIG. 9 is a diagram illustrating the configuration of an MPEG stream (VOB)

FIG. 9 is a diagram illustrating the configuration of an MPEG stream (VOB) used in the present embodiment. As illustrated in FIG. 9, a VOB is made up of multiple Video Object Units (VOBU). A VOBU is a unit based on a Group Of Pictures (GOP) in a MPEG video stream, and is one playback unit in a multiplexed stream including audio data.

A VOBU has playback time of 0.4 seconds to 1.0 seconds, and normally has playback time of 0.5 seconds. This is due to the MPEG GOP structure normally being 15 frames/second (in the case of NTSC).

A VOBU has a video pack (V_PCK) that is video data and an audio pack (A_PCK) that is audio data therein. Each pack is configured of 1 sector, and in the case of the present embodiment is configured in 2 kB units.

Figure 10:
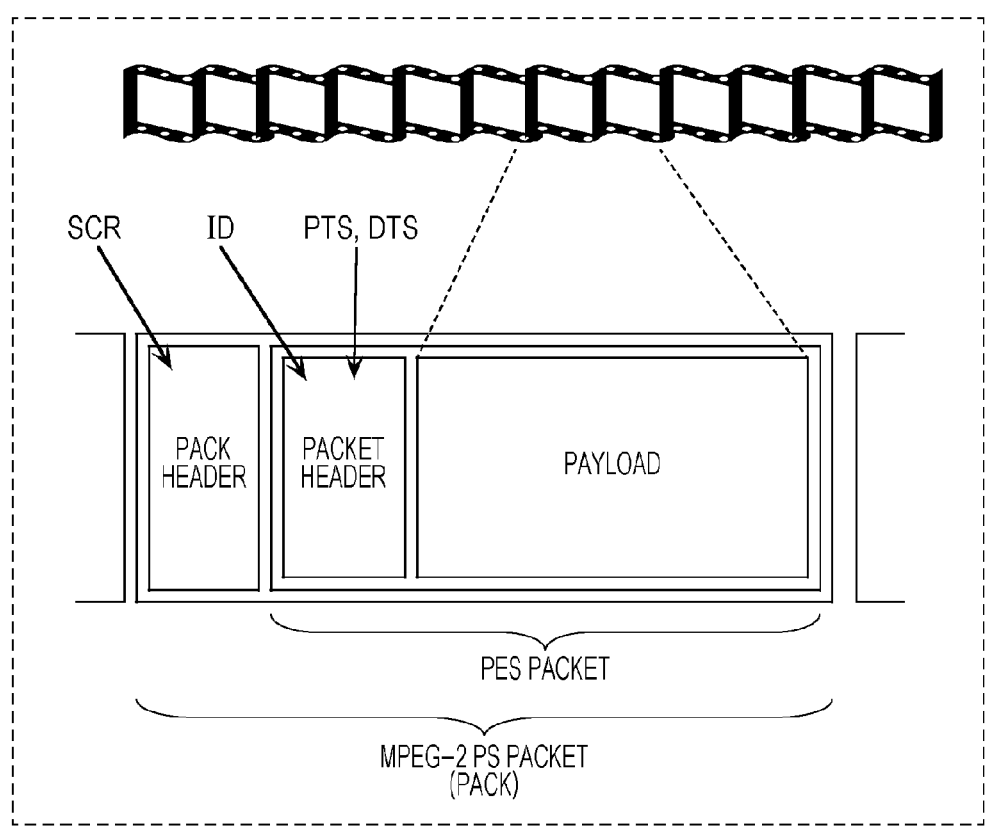
FIG. 10 is a diagram illustrating the configuration of packs in an MPEG stream.

FIG. 10 is a diagram illustrating the configuration of a pack in an MPEG stream. Elementary data such as video data and audio data are sequentially input from the beginning of a data storage region in a packet, called a payload, as illustrated in FIG. 10. A packet header is attached to a payload, making up one packet.

Recorded in the packet header is an ID (stream_id) for identifying which stream the data stored the payload belongs to, whether video data or audio data, and in a case there are multiple streams worth of video data or audio data, which stream the data belongs to, and a Decode Time Stamp (DTS) and Presentation Time Stamp (PTS) that are timestamps for the decoding and displaying time information of this payload.

Not all packet headers necessarily have a DTS and PTS recorded; rules for recording are stipulated in MPEG. Details of the rules are laid forth in the MPEG system (ISO/IEC13818-1) Standard, and accordingly will be omitted here.

A header (pack header) is further added to the packet, thereby making up a pack. The pack header has recorded therein a System Clock Reference (SCR) that is a timestamp indicating when this pack passes through the demultiplexer 310 and is to be input to decoder buffers of the individual elementary streams.

Interleaved Recording of VOB

Figure 11:
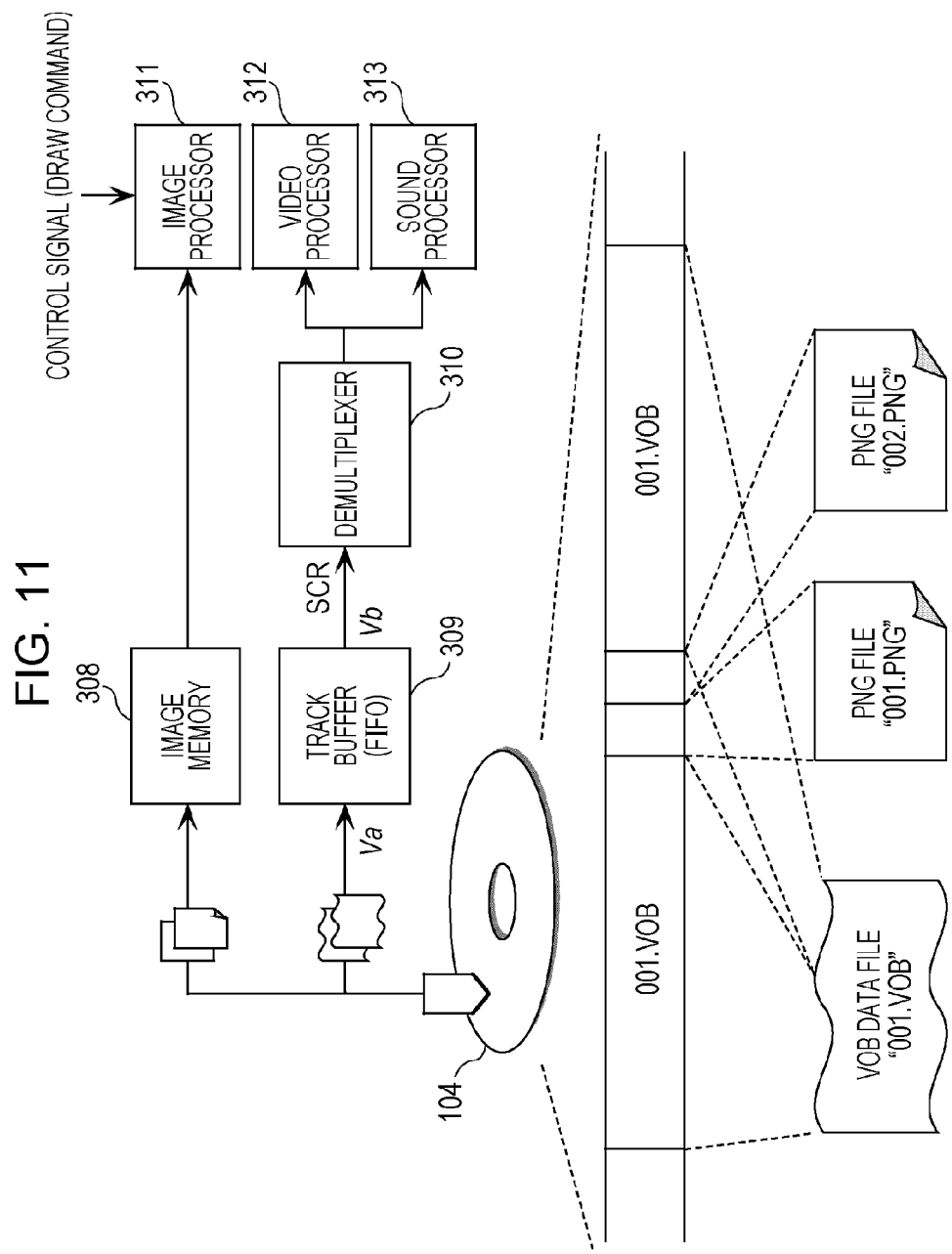
FIG. 11 is a diagram for describing the relationship between AV data and player configuration.

Interleaved recorded of VOB files will be described with reference to FIGS. 11 and 12. FIG. 11 is a diagram for describing the relationship between the AV data and the configuration of a BD-ROM player.

The drawing at the upper tier in FIG. 11 is part of the player configuration diagram described above with reference to FIG. 7. The data in the BD-ROM is passes through the optical pickup 202 and is input to the track buffer 309 if a VOB, i.e., an MPEG stream, and input to the image memory 308 if a PNG, i.e., image data as illustrated in FIG. 11.

The track buffer 309 is a First-In First-Out (FIFO), with input VOB data being sent to the demultiplexer 310 in the order in which it was input. At this time, the individual packs are extracted from the track buffer 309 according to the aforementioned SCR, and data is delivered to the video processor 312 or sound processor 313 via the demultiplexer 310.

On the other hand, In a case of image data, which image to draw is instructed by the presentation controller 306 (see FIG. 7). The image data used for drawing is deleted from the image memory 308 at the same time if image data for subtitles, but is retained in the image memory 308 if image data for a menu. This is because drawing of the menu is dependent on user operations, so there is the possibility that the same image will be drawn multiple times.

The drawing at the lower tier in FIG. 11 is a diagram illustrating interleaved recording of a VOB file and PNG files on the BD-ROM. Generally, in the case of a CD-ROM or DVD-ROM for example, AV data that is a series of continuous playing units is recorded continuously. As long as the data is recorded continuously, all the drive has to do is to sequentially read out the data and deliver it to the player side.

However, in a case where the AV data to be continuously play is fragmented and dispersed across the disc, seek operations are interposed between the individual continuous sections, and data readout stops during this time. That is to say, supply of data may stop.

In the same way, recording of a VOB file in a continuous region is desirable for BD-ROMs as well, but there is data such as subtitle data for example, that is to be played synchronously with the video data in the VOB, so the subtitle data needs to be read out from the BD-ROM in one way or another.

One way of reading out subtitle data is to read out all subtitle image data (PNG file) before starting playback of the VOB. However in this case, a great amount of memory is necessary to use for temporary recording, so this is not realistic. Accordingly, method where a VOB file is divided into several blocks, and the VOB file and image are subjected to interleaved recording is employed with the present embodiment.

The lower tier in FIG. 11 is a diagram for describing interleaved recording. By suitably performing interleaved placement of the VOB file and image data, image data can be stored in the image memory 308 at a necessary timing, without the great amount of temporary recording memory described above. However, while the image data is being read out, readout of VOB data stops, as a matter of course.

Figure 12:
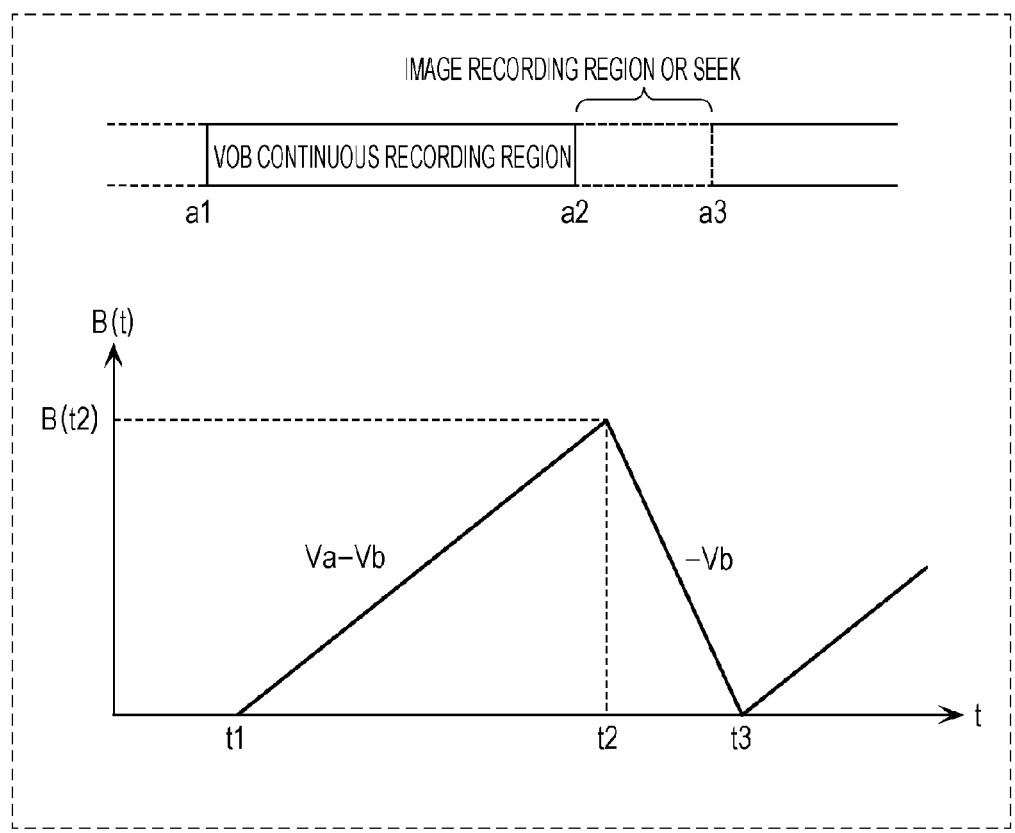
FIG. 12 is a diagram for describing a VOB data continuous supply model using a track buffer.

FIG. 12 is a diagram for describing a VOB data continuous supply model using the track buffer 309, to solve the above problem in interleaved recording. As described earlier, VOB data is temporarily stored in the track buffer 309. Setting the data input rate to the track buffer 309 to be higher than the data output rate from the track buffer 309 means that the amount of data sorted in the track buffer 309 continues to increase, as long as data is being read out from the BD-ROM.

Now, the input rate to the track buffer 309 is denoted by Va, and the output rate from the track buffer 309 is denoted by Vb. One continuous recording region of the VOB continues from logical address "a1" to "a2" as illustrated at the upper tier in FIG. 12. From "a2" to "a3" is a section where image data is recorded, so VOB data cannot be read out.

The drawing at the lower tier in FIG. 12 is a diagram illustrating the stored amount in the track buffer 309. The horizontal axis represents time, and the vertical axis represents the amount of data sorted inside the track buffer 309. The time "t1" indicates the time at which readout of the continuous recording region of the VOB "a1" has started.

After this time, data will be accumulated in the track buffer 309 at a rate of Va–Vb. It is needless to say that this is the difference in the input/output rates of the track buffer 309. Time "t2" is the time to read in data at "a2", and is the end point of one continuous recording region.

That is to say, the amount of data in the track buffer 309 increases at the rate of Va−Vb from "t1" to "t2", and the data accumulation amount B(t2) at the time "t2" can be calculated by the following Expression (1).

$$B(t2)=(Va-Vb)\times(t2-t1) \quad \text{Expression (1)}$$

Thereafter, image data continues until the address "a3" on the BD-ROM, so input to the track buffer 309 is 0, and the amount of data within the track buffer 309 decreases at an output rate "−Vb". This reduction in data amount continues until the readout position "a3", i.e., until the time "t3".

What is important here is that once the data amount stored in the track buffer 309 before time "t3" reaches 0, there is no more VOB data to supply to the decoder, so playback of the VOB will stop. However, in a case where the is data remaining in the track buffer 309 at time "t3", this means that playback of the VOB can be continued without stopping.

The conditions for the VOB playback to be continuously performed without stopping can be expressed by the following Expression (2).

$$B(t2)\geq -Vb\times(t3-t2) \quad \text{Expression (2)}$$

That is to say, the array of image data should be decided so as to satisfy Expression (2).

Navigation Data Structure

Figure 13:
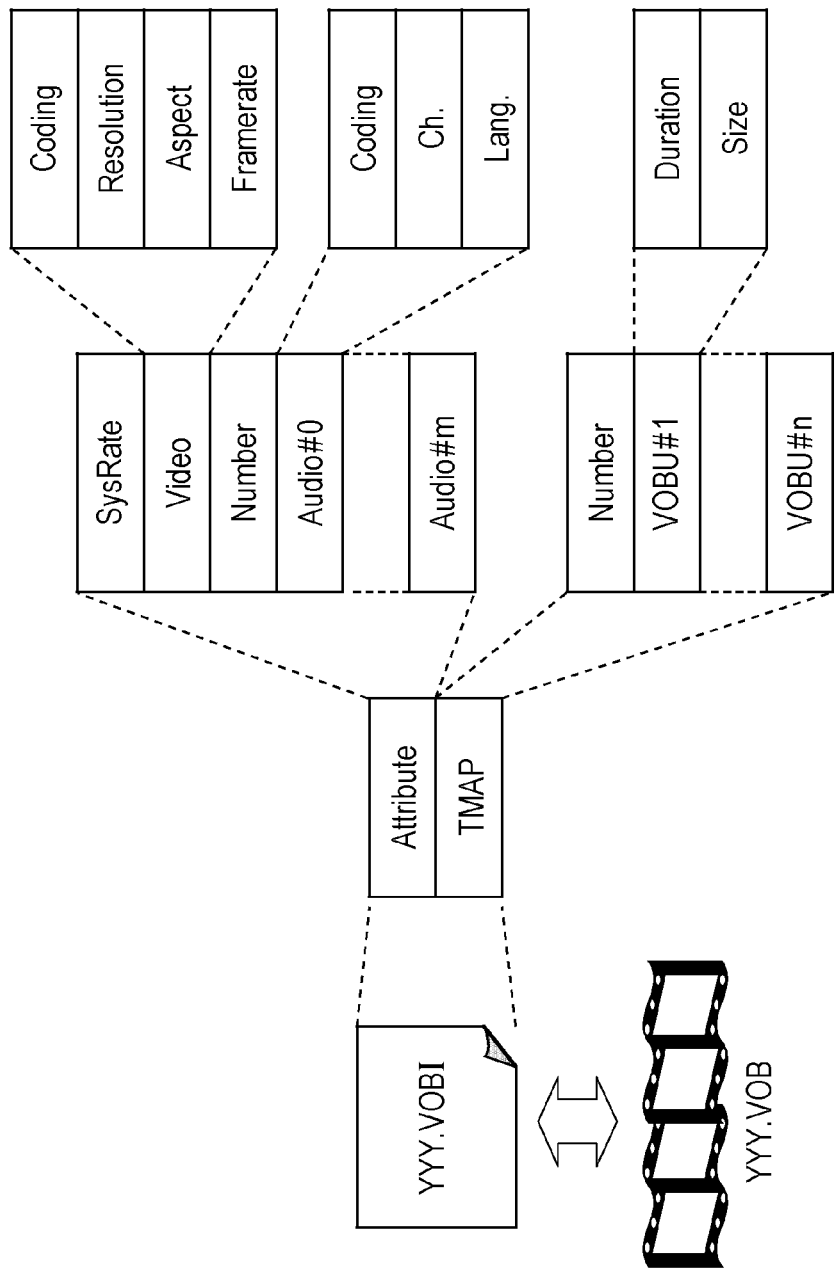
FIG. 13 is a diagram illustrating the internal structure of a VOB management information file.

The structure of navigation data (BD management information) recorded in the BD-ROM will be described with reference to FIGS. 13 through 19. FIG. 13 is a diagram illustrating the internal structure of a VOB management information file ("YYY.VOBI").

The VOB management information has stream attribute information (Attribute) and a time map (TMAP) of this VOB. The stream attribute information is of a configuration having video attributes (Video) and audio attributes (Audio#0 through Audio#m) individually. Particularly, in the case of an audio stream, the VOB can have multiple audio streams at the same time, so the number of data fields of the audio attributes is identified by the number of audio streams (Number).

The following is an example of fields that the video attributes (Video) have, and values which each can have.
Compression Format (Coding):
MPEG1
MPEG2
MPEG4
Resolution (Resolution):
1920×1080
1280×720
720×480
720×565
Aspect Ratio (Aspect):
4:3
16:9
Frame Rate (Framerate):
60
59.94
50
30
29.97
25
24

The following are example of fields that the audio attributes (Audio) have, and values which each can have.
Compression Format (Coding):
AC3
MPEG1
MPEG2
LPCM
Number of Channels (Ch):
1 to 8
Language Attributes (Language):
JPN, ENG, . . .

The time map (TMAP) is a table having information for each VOBU, and holds the number of VOBUs (Number) that the VOB has, and each VOBU information (VOBU#1 through VOBU#n). Each VOBU information has a playtime length (Duration) of the VOBU and data size (Size) of the VOBU.

Figure 14:
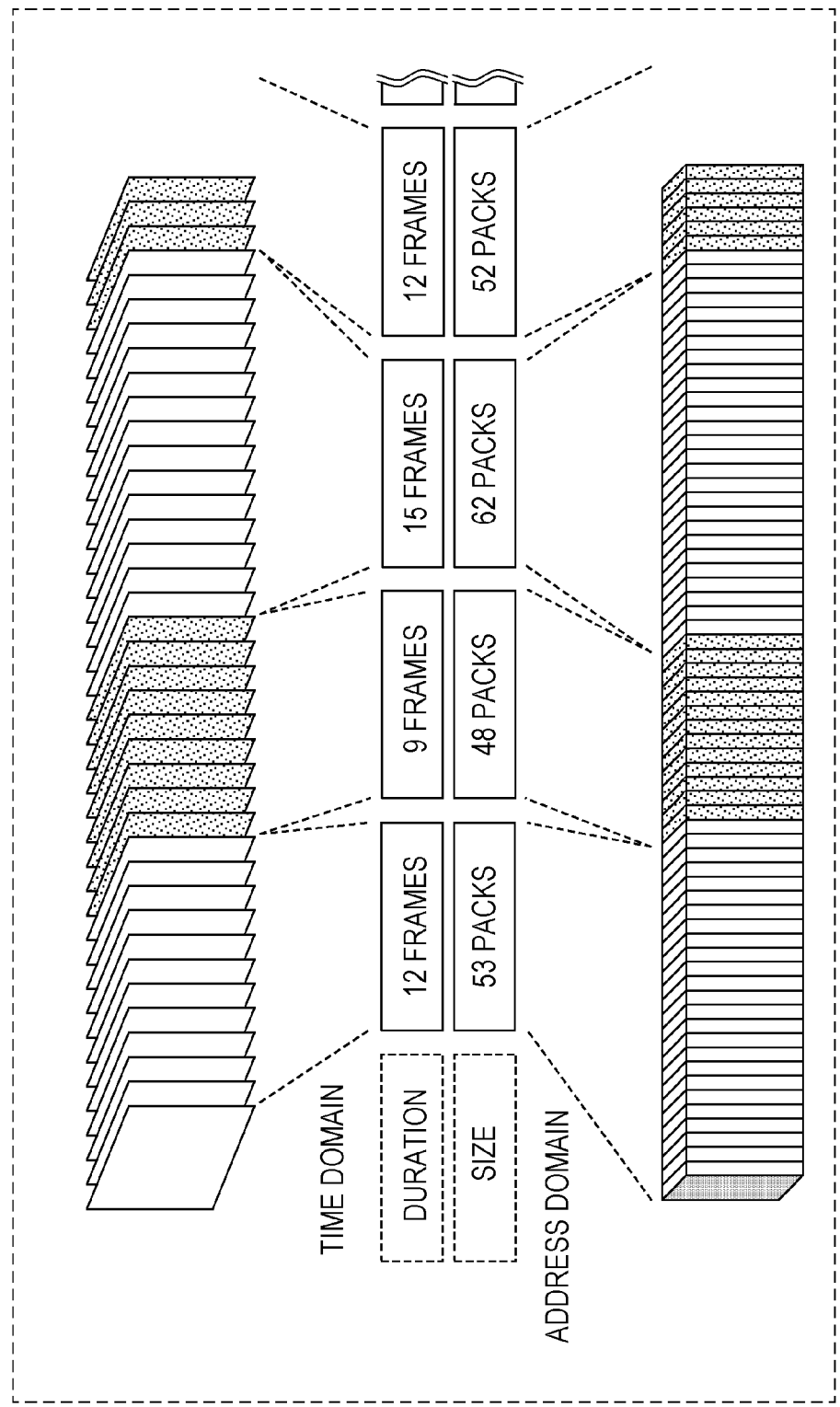
FIG. 14 is a diagram for describing the details of VOBU information.

FIG. 14 is a diagram for describing the details of VOBU information. It is widely known that the MPEG stream has aspects regarding two physical amounts, a temporal aspect and a data-size aspect. For example, Audio Code number 3 (AC3) that is an audio compression standard performs compression at a fixed bitrate, so the relationship between time and address can be obtained by a primary expression. However, in the case of MPEG video data, each frame has a fixed display time such as 1/29.97 seconds in the case of NTSC for example, but the data size of each frame after compression will vary greatly depending on the picture properties and the picture type used in compression, which are the so-called I/P/B pictures. Accordingly, it is impossible to expression the relationship between time and address by a common expression in the case of MPEG video.

As a matter of course, it is impossible to expression the relationship between time and data by a common expression, with regard to an MPEG stream where MPEG video data has been multiplexed, i.e., a VOB, as well. Instead, the relationship between time and address within the VOB is associated by a time map (TMAP). A table which has the number of frames in each VOBU and the number of packs in the VOBU as entries is the time map (TMAP), as illustrated in FIG. 14.

Figure 15:
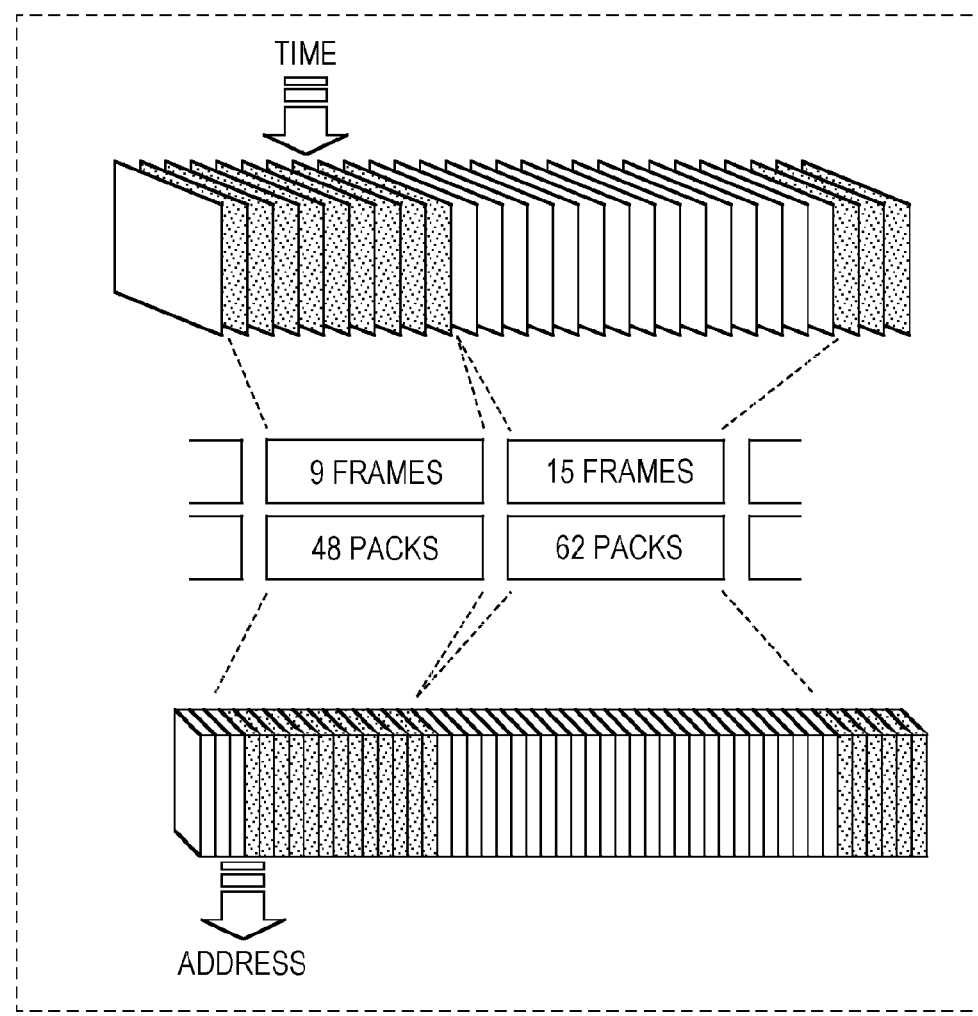
FIG. 15 is a diagram for describing an address information acquisition method using a time map.

How to use a time map (TMAP) will be described with reference to FIG. 15. FIG. 15 is a diagram for describing an address information acquisition method using a time map.

In a case where time information (Time) is provided, as illustrated in FIG. 15, first, to which VOBU that time belongs is searched for. Specifically, the number of frames is added for each VOBU in the time map, and the VOBU where the sum of the number of frames exceeds or matches the value obtained by converting this time into the number of frames is the VOBU that corresponds to this time.

Next, the size for each VOBU in the time map are added up to the VOBU immediately preceding this VOBU, and that values is the beginning address (Address) of the pack to be read out to play the frame including the time that has been given. Accordingly, an address corresponding to given time information can be obtained in an MPEG stream.

Figure 16:
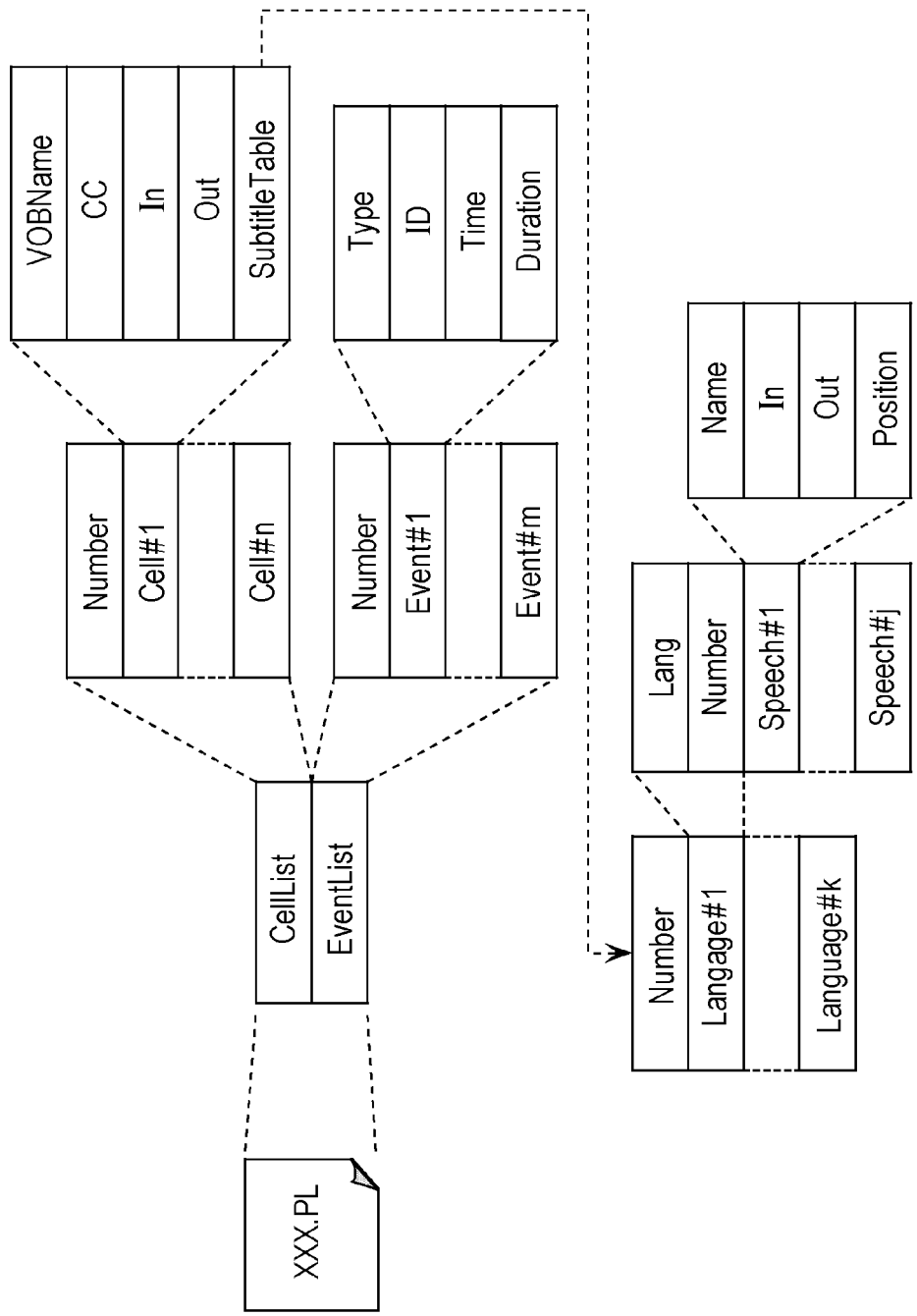
FIG. 16 is a diagram illustrating the configuration of a playlist.

Next, the internal structure of the playlist ("XXX.PL") will be described with reference to FIG. 16. FIG. 16 is a diagram illustrating the configuration of a playlist.

A playlist is made up of a cell list (CellList) and event list (EventList). A cell list (CellList) is information indicating the playback cell sequence within the playlist, and cells are played in the order of description in this list. The content of a cell list (CellList) is the number of cells (Number) and information of each cell (Cell#1 through Cell#n).

The information of each cell (Cell#1 through Cell#n) has the VOB filename (VOBName), the valid section start time (In) and valid section end time (Out) in this VOB, and a subtitle table (SubtitleTable).

The valid section start time (In) and valid section end time (Out) are each expressed by frame No. within this VOB, and the address for VOB data necessary for playback can be obtained by using the above-described time map (TMAP).

The subtitle table (SubtitleTable) is a table having subtitle information that is synchronously played with this VOB. The subtitles may have multiple languages, in the same way as with the audio. The subtitle table (SubtitleTable) is made up of the number of languages (Number) and a subsequent table for each language (Language#1 through Language#k).

The table for each language (Language#1 through Language#k) is made up of language information (Language), the number of pieces of subtitle information of the subtitles to be displayed (Number) The subtitle information of the subtitles to be displayed (Speech#1 through Speech#j). Each subtitle information (Speech#1 through Speech#j) is made up of a corresponding image data filename (Name), subtitle display start time (In) and subtitle display end time (Out), and subtitle display position (Position).

The event list (EventList) is a table defining events occurring within this playlist. The event list is made up of the number of events (Number), and following this the individual events (Event#1 through Event#m), each event (Event#1 through Event#m) being made up of event type (Type), event ID (ID), event generation time (Time), and valid period (Duration).

Figure 17:
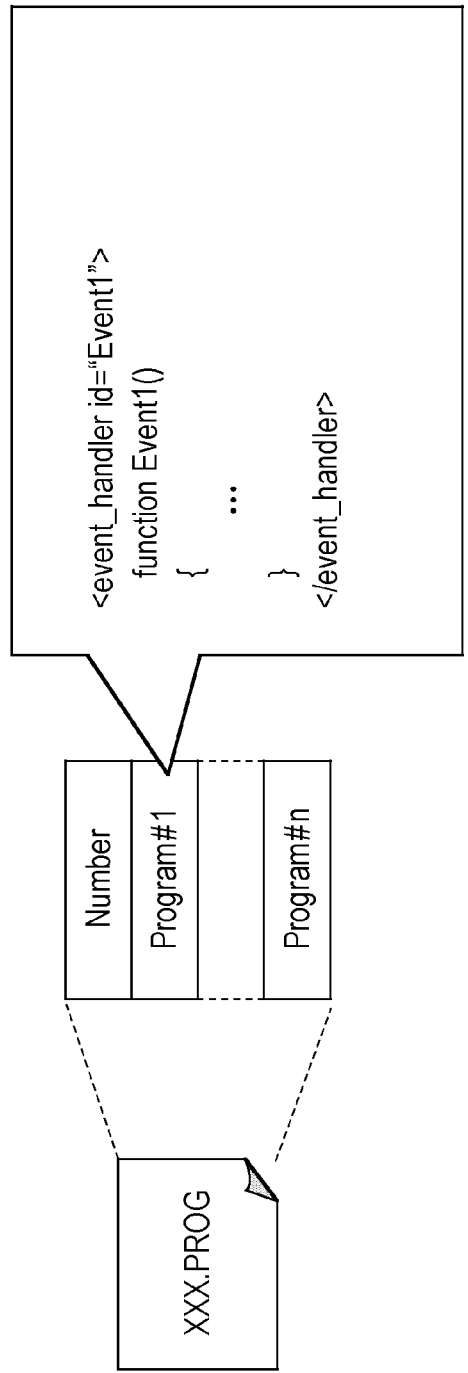
FIG. 17 is a diagram illustrating the configuration of an event handler table.

FIG. 17 is a diagram illustrating the configuration of an event handler table ("XXX.PROG") that has an event handler (time-based events, and user events for menu selection), for each playlist.

The event handler table contains the number of event handlers/programs that are defined (Number), and individual event handlers/programs (Program#1 through Program#n).

The description within each of the event handlers/programs (Program# through Program#n) contains a definition of the start the event handler (an <event_handler> tag) and an event handler ID (event_handler id) that is paired with the aforementioned event ID. Following this, the program is described between brackets "{" and "}" after "function".

Figure 18:
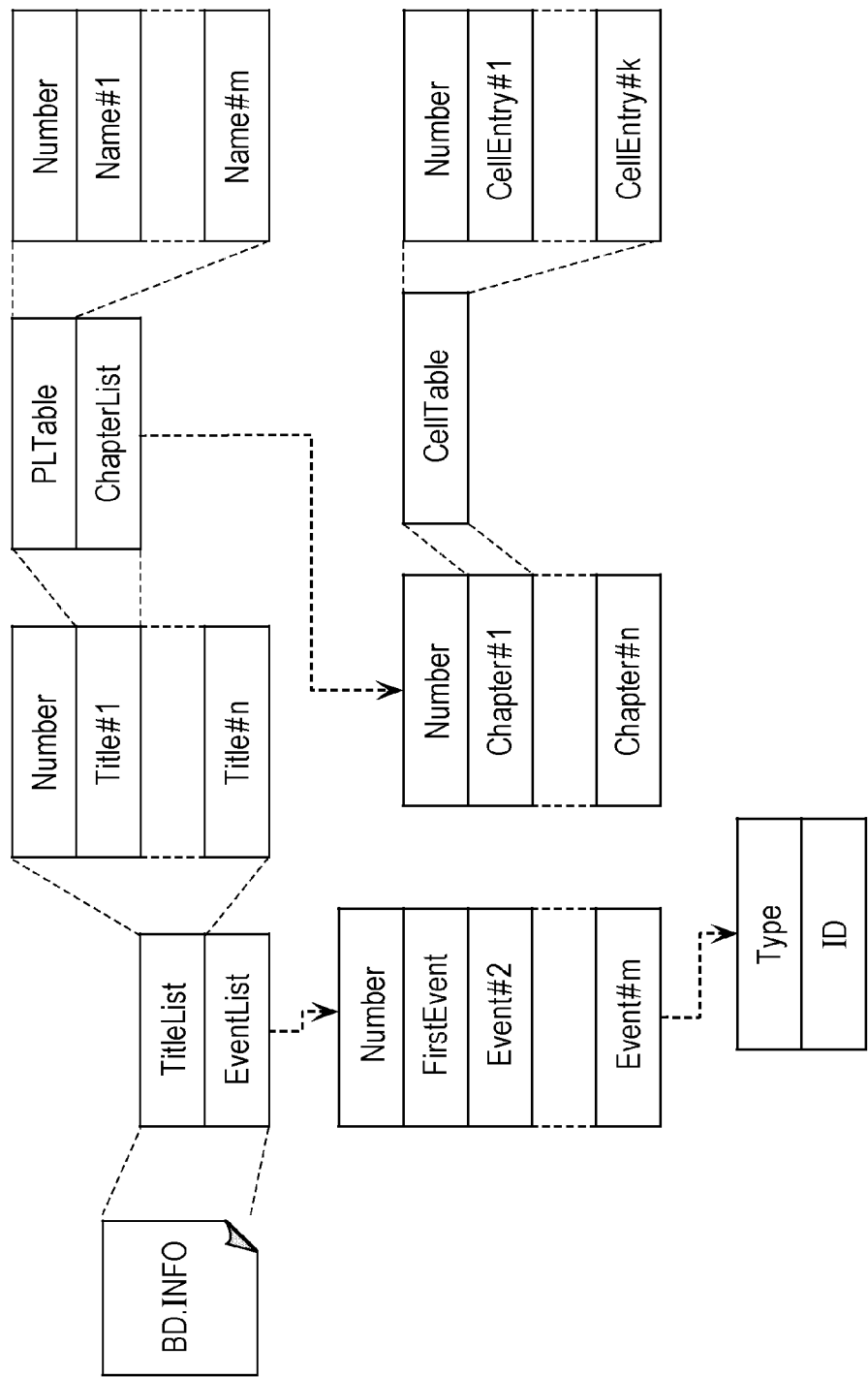
FIG. 18 is a diagram illustrating the configuration of BD.INFO which is overall BD-ROM information.

Next, the information relating to the entire BD-ROM ("BD.INFO") will be described with reference to FIG. 18. FIG. 18 is a diagram illustrating the configuration of BD.INFO which is overall BD-ROM information.

The overall BD-ROM information is made up of a title list (TitleList) and event list (EventList) for global events. The title list (TitleList) is made up of the number of titles in the disc (Number), and subsequently each title information (Title#1 through Title#n).

Each title information (Title#1 through Title#n) includes a playlist table (PLTable) and a chapter list within the title (ChapterList). The playlist table (PLTable) includes the number of playlist in the title (Number) and the playlist names (Name), i.e., the filenames of the playlists.

The chapter list (ChapterList) is made up of the number of chapters included in this title (Number), and each chapter information (Chapter#1 through Chapter#n). Each chapter information (Chapter#1 through Chapter#n) has a table of cells that this chapter includes (CellTable), the cell table (CellTable) being made up of the number of cells (Number) and entry information of each cell (CellEntry#1 through CellEntry#k). Cell entry information (CellEntry#1 through CellEntry#k) is described as the playlist name containing this cell and the cell No. within the playlist.

The event list (EventList) has the number of global events (Number) and information of each global event (Event#1 through Event#m). What is noteworthy here is that the global event that is defined first is called a first event (FirstEvent), and is the event that is executed first when the BD-ROM is inserted into the player. Each global event information (Event#1 through Event#m) has only the event type (Type) and ID of the event (ID).

Figure 19:
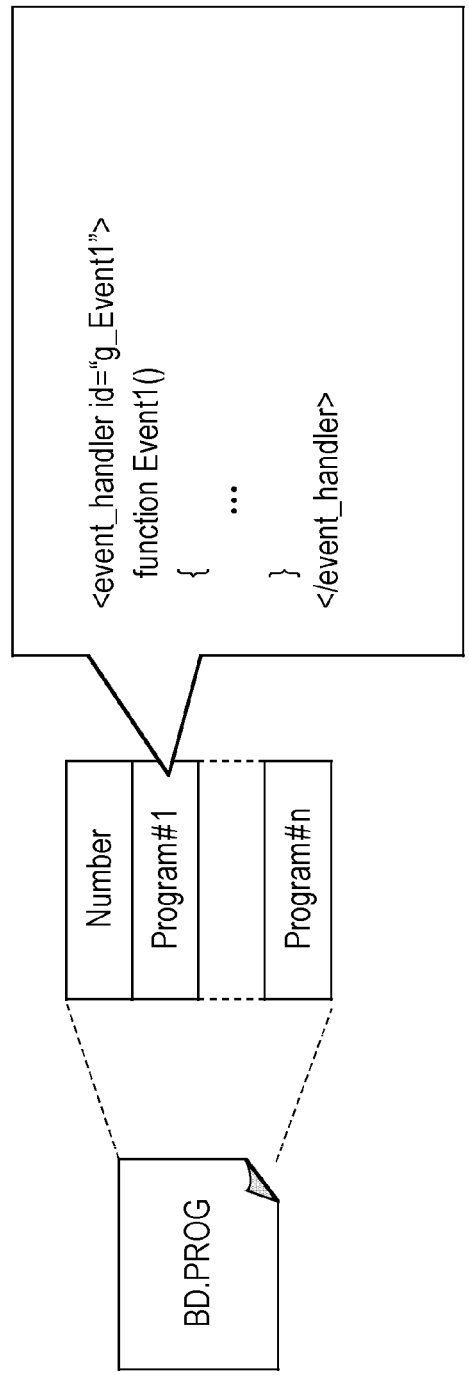
FIG. 19 is a diagram illustrating the structure of a global event handler table.

FIG. 19 is a diagram illustrating the structure of the global event handler table ("BD.PROG"). This table is the same in content as the event handler table described in FIG. 17, so description thereof will be omitted.

Mechanism of Event Occurrence

Figure 20:
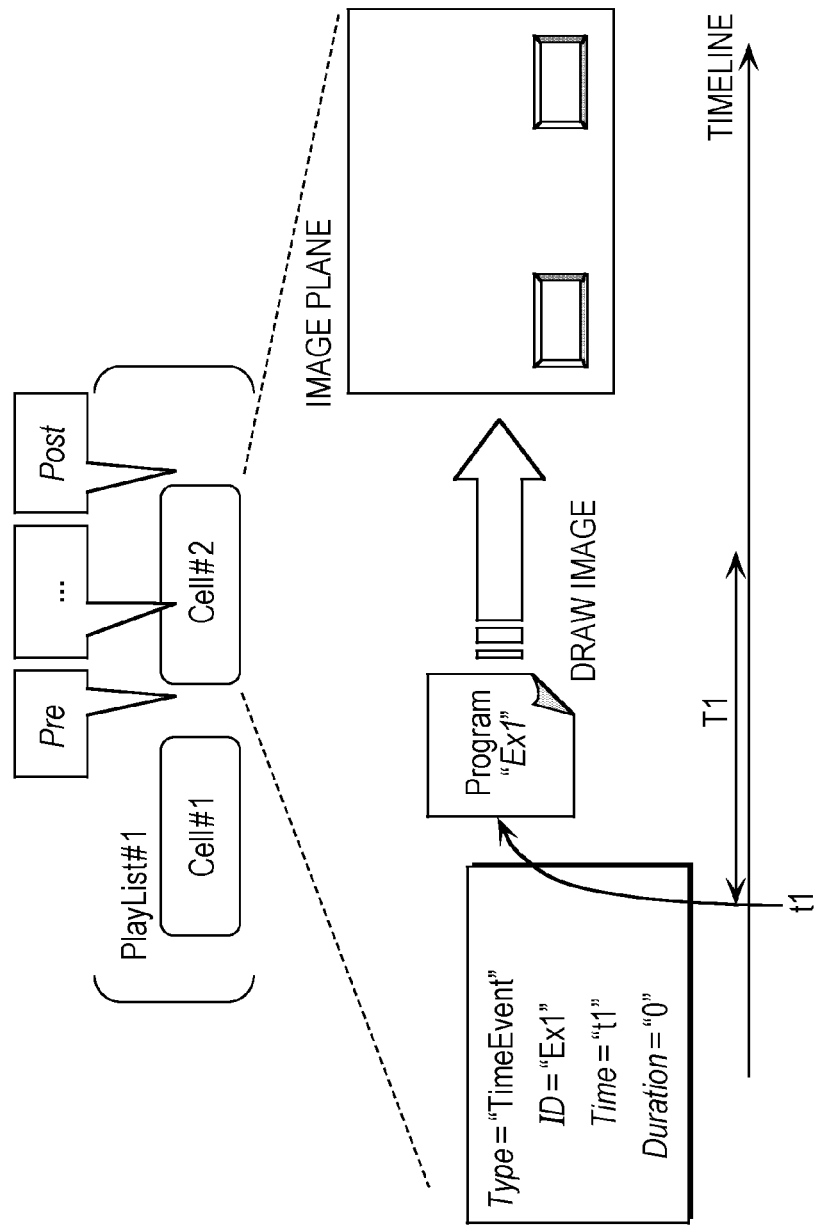
FIG. 20 is a diagram illustrating an example of a time event.

The mechanism of event occurrence will be described with reference to FIGS. 20 through 22. FIG. 20 is a diagram illustrating an example of a time event. As described above, a time event is defined by the event list (EventList) in the playlist ("XXX.PL"). In a case of an event defined as a time event, i.e., event type (Type) is "TimeEvent", at the point of the event generation time ("t1"), a time event having the ID "Ex1" is output from the scenario processor 305 to the program processor 302.

The program processor 302 searches for the handler that has the event ID "Ex1", and executes the relevant event handler. For example, in the case of the present embodiment, a two-button image can be drawn, or the like.

Figure 21:
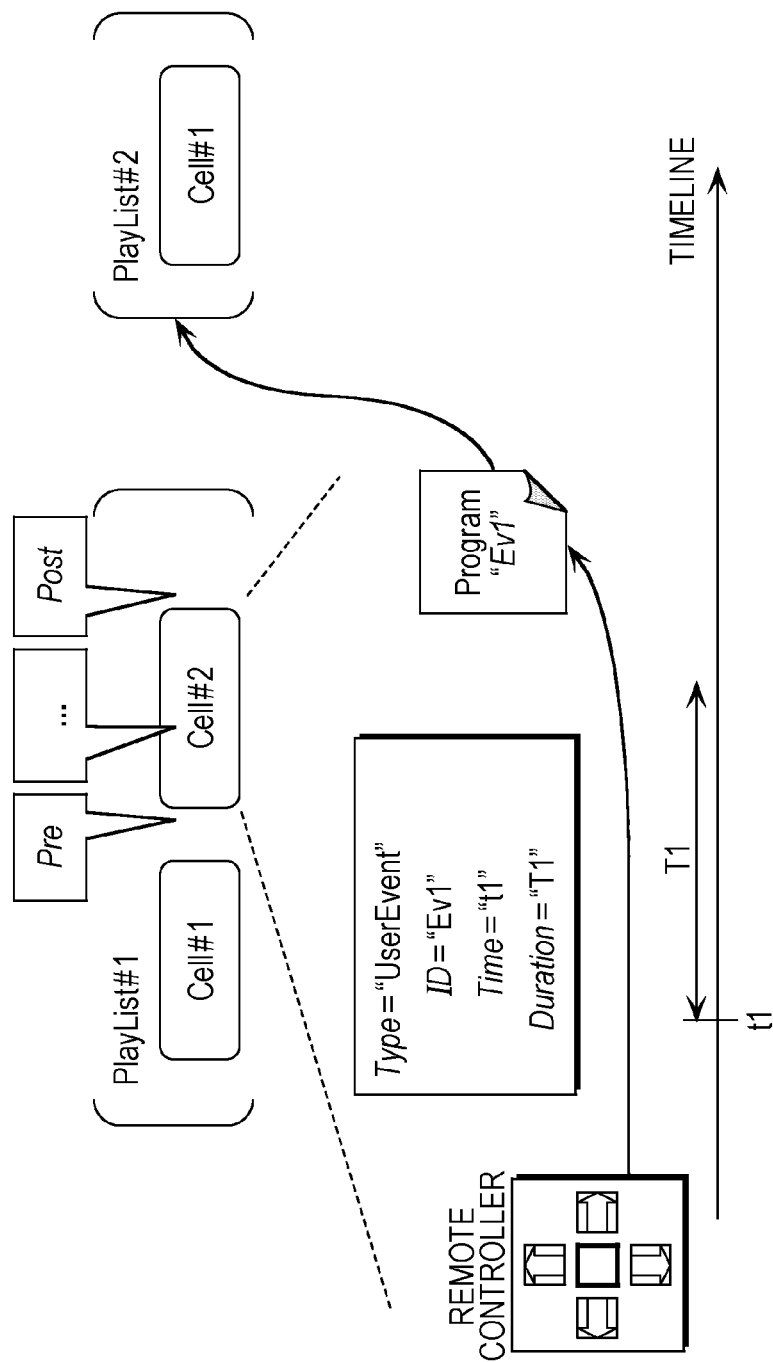
FIG. 21 is a diagram illustrating an example of a user event due to a user having operated a menu.

FIG. 21 is a diagram illustrating an example of a user event due to a user having operated a menu. As described above, a user event due to menu operations is also defined by the event list (EventList) in the playlist ("XXX.PL").

In the case of an event defined as a user event, i.e., in a case where the event type (type) is "UserEvent", this user event is ready at the point that of reaching the event generation time ("t1"). At this time, the event itself is not generated yet. This event is in a ready state during the period ("T1") described in the valid standard information (Duration).

When a remote controller key "up", "down", "left", or "right", has been pressed by the user, or when the "OK" key has been pressed, first, a UO event is generated by the UO manager 303 and output to the program processor 302, as illustrated in FIG. 21.

The program processor 302 hands a UO event to the scenario processor 305, and upon receiving the UO event, the scenario processor 305 searches for whether or not a valid user event exists. In a case where there is a relevant user event as the result of the search, the scenario processor 305 generates a user event, and outputs to the program processor 302.

The program processor 302 searches for an event handler having the event ID, in the case of the example illustrated in FIG. 21 for example, "Ev1", and executes the relevant event handler. In the case of this example, playback of playlist#2 is started.

The generated user event does not include information regarding which remote controller key has been pressed by the user. The information of the remote controller key that has been selected is notified to the program processor 302 by the UO event, and is recorded and held in a register that the virtual player has. The program of the event handler can check the value of this register and execute branching processing.

Figure 22:
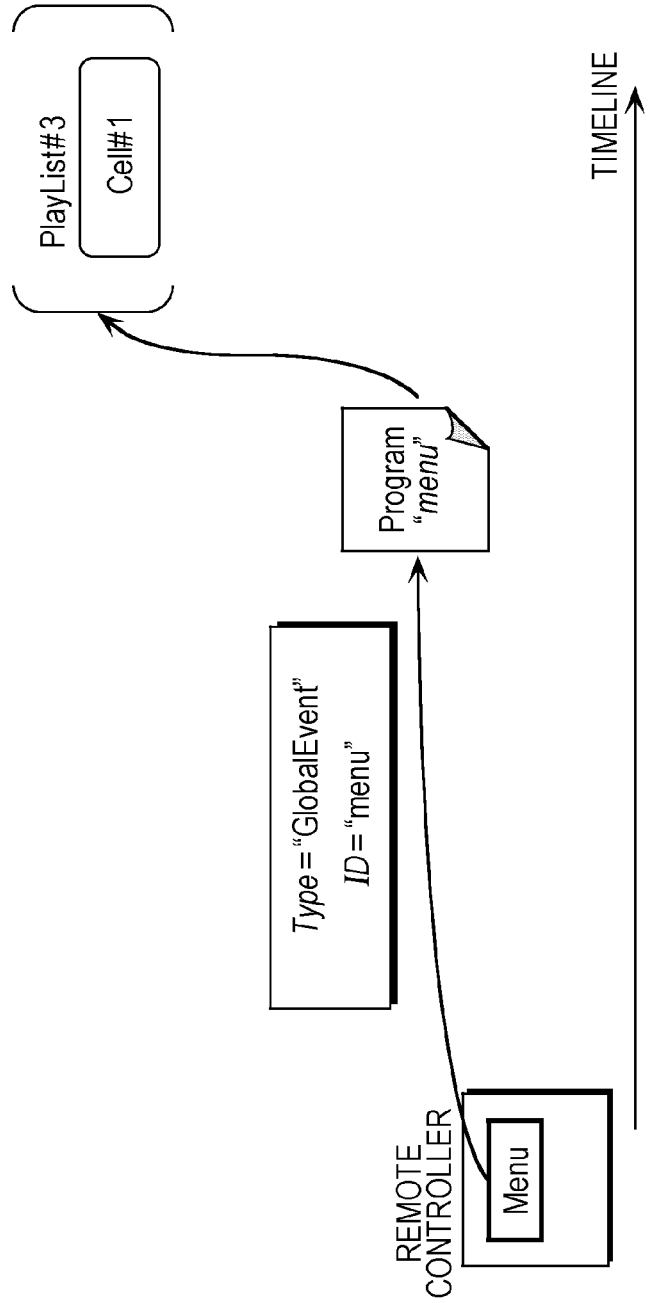
FIG. 22 is a diagram illustrating an example of a global event.

FIG. 22 is a diagram illustrating an example of a global event. As described earlier, a global event is defined in the event list (EventList) in the overall BD-ROM information (""BD.INFO"). An event defined as a global event, i.e., an event of which the event type (Type) is "GlobalEvent", is generated only in a case where the user has operated a remote controller key.

In a case where the user has pressed the menu key, first, a UO event is generated by the UO manager 303 and output to the program processor 302. The program processor 302 hands the UO event to the scenario processor 305.

The scenario processor 305 generates the relevant global event, and sends it to the program processor 302. The program processor 302 searches for an event handler having the event ID "menu", and executes this event handler. For example, in the case of the example illustrated in FIG. 22, playback of playlist#3 is started.

In the present embodiment, this is referred to simply as menu key, but there may be multiple menu keys such as on the remote controller of a player that plays DVDs. Defining an ID corresponding to each menu key enables appropriate processing to be performed as to each menu key.

Virtual Player Machine

FIG. 23 is a diagram for describing the functional configuration of the program processor 302. The functional configuration of the program processor 302 will be described with reference to FIG. 23.

The program processor 302 is a processing module that has a virtual player machine inside. A virtual player machine is a function model defined as a BD-ROM, and is not dependent on the implementation of each BD-ROM player. That is to say, this guarantees that the same function can be executed in every BD-ROM player.

A virtual player machine has two major functions; programming functions and player variables. The player variables are stored and held in a register.

The programming functions are based on Java (registered trademark) Script, and the following three functions are defined as BD-ROM-unique functions. Link function: Stops the current playback, and starts playback from specified playlist, cell, and time.

Link (PL#, Cell#, Time)
PL#: playlist name
Cell#: cell No.
Time: time in cell to start playback PNG drawing function: Draws specified PNG data on image plane 209.

Draw (File, X, Y)
File: PNG filename
X: X coordinate position
Y: Y coordinate position Image plane clear function: Clears specified region of image plane 209.

Clear (X, Y, W, H)
X: X coordinate position
Y: Y coordinate position
W: width in X direction
H: width in Y direction The player variables include system parameters (SPRM) indicating setting values and so forth of the player, and general parameters (GPRM) usable in general uses.

FIG. 24 is a diagram illustrating a list of system parameters (SPRM).

SPRM(0): Language code
SPRM(1): Audio stream No.
SPRM(2): Subtitle stream No.
SPRM(3): Angle No.
SPRM(4): Title No.
SPRM(5): Chapter No.
SPRM(6): Program No.
SPRM(7): Cell No.
SPRM(8): Selected key information
SPRM(9): Navigation timer
SPRM(10): playback time information
SPRM(11): Mixing mode for karaoke
SPRM(12): Country information for parental
SPRM(13): Parental level
SPRM(14): Player setting value (video)
SPRM(15): Player setting value (audio)
SPRM(16): Language code for audio stream
SPRM(17): Language code for audio stream (extended)
SPRM(18): Language code for subtitle stream
SPRM(19): Language code for subtitle stream (extended)
SPRM(20): Player region code
SPRM(21): reserved
SPRM(22): reserved
SPRM(23): Playback state
SPRM(24): reserved
SPRM(25): reserved
SPRM(26): reserved
SPRM(27): reserved
SPRM(28): reserved
SPRM(29): reserved
SPRM(30): reserved
SPRM(31): reserved Note that in the present embodiment, the programming functions of the virtual player have been described as being based on Java (registered trademark) Script, Other programming functions may be used, such as B-Shell used in UNIX (registered trademark) OS or the like, Perl Script, and so forth, instead of Java (registered trademark) Script. In other words, the programming language in the present disclosure is not restricted to Java (registered trademark) Script.

Example of Program

Figure 25:
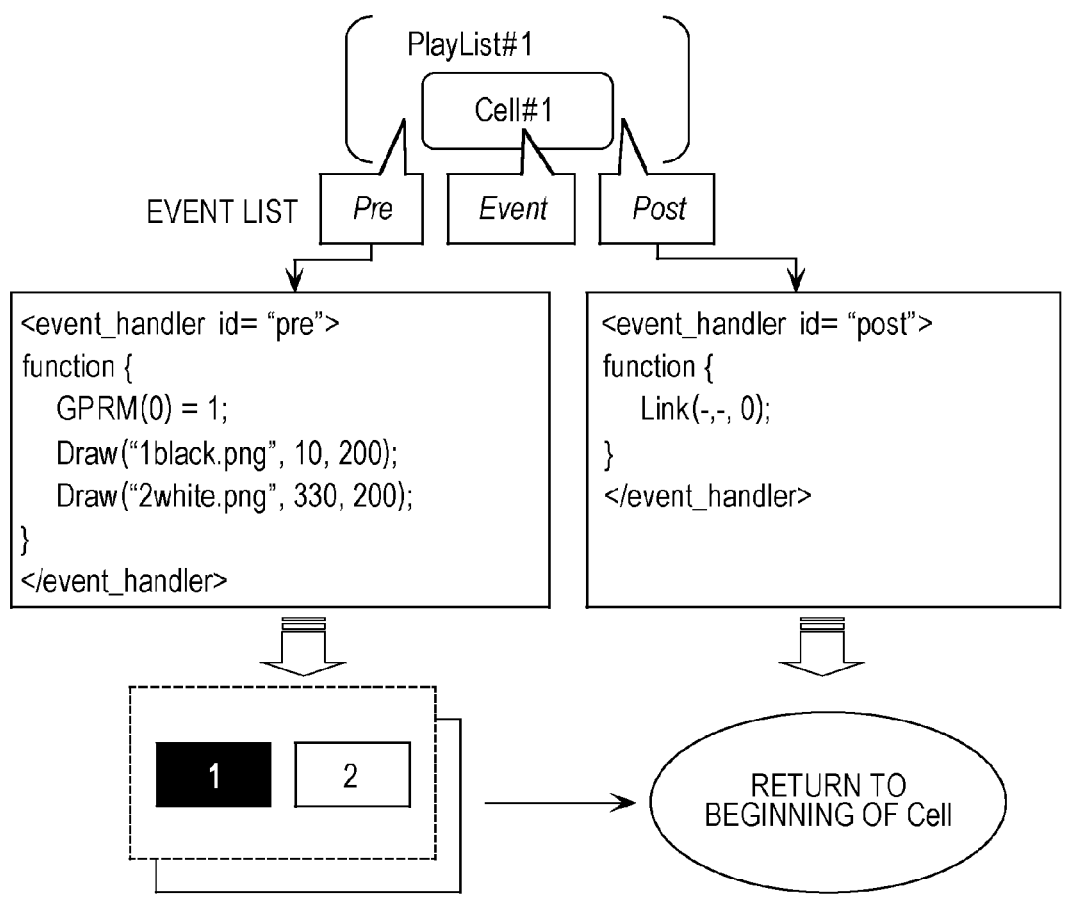
FIG. 25 is a diagram illustrating an example of a program in an event handler according to control of a menu screen having two selection buttons.
Figure 26:
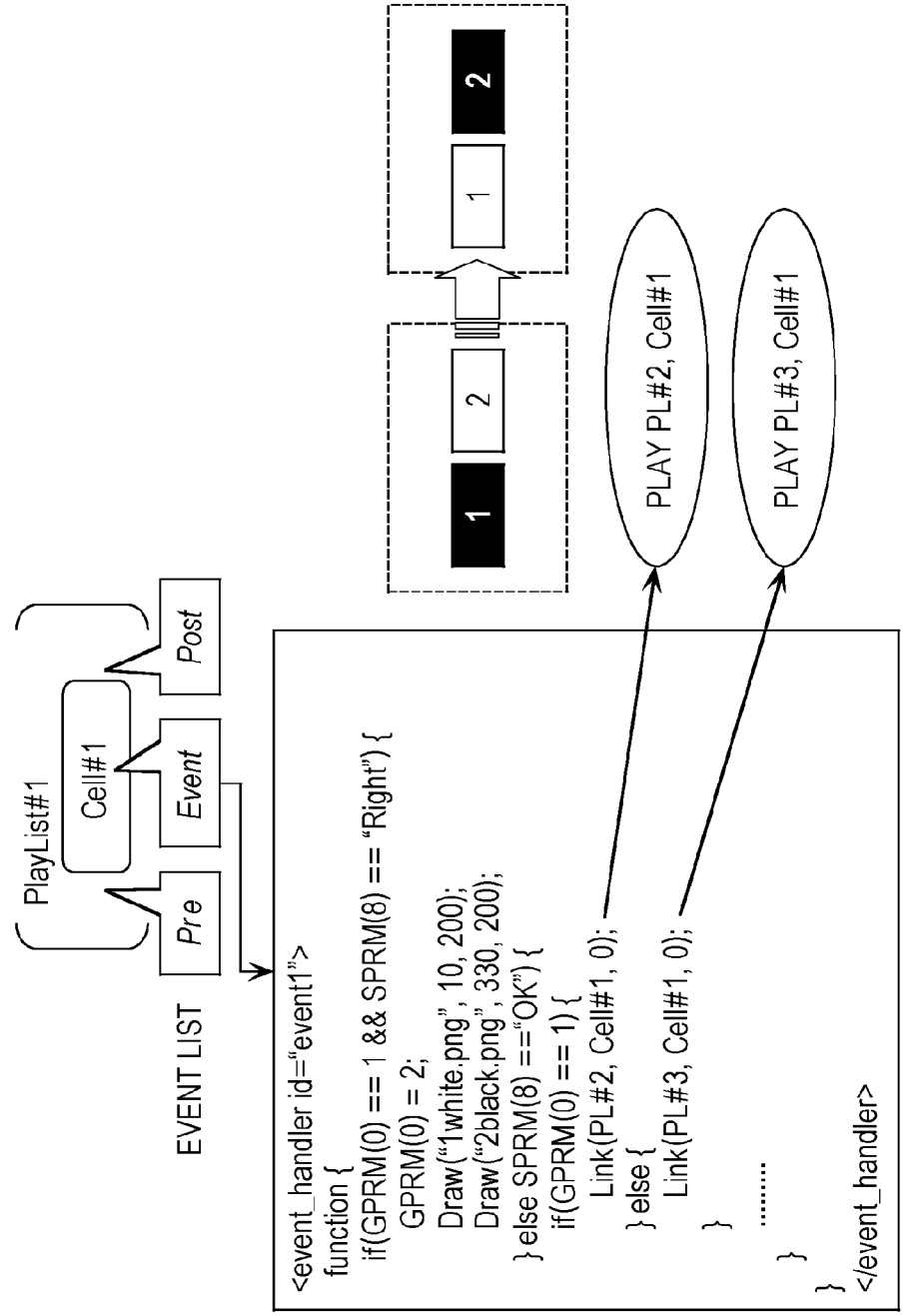
FIG. 26 is a diagram illustrating an example of a program in an event handler relating to a menu selection user event.

FIGS. 25 and 26 are diagrams illustrating an example of a program in the event handler. FIG. 25 is a diagram illustrating an example of a program in an event handler according to control of a menu screen having two selection buttons.

The program to the left side in FIG. 25 is executed using a time event at the beginning of cell (PlayList#1.Cell#1). "1" is set to GPRM(0) here first, which is one of the general parameters. GPRM(0) is used in this program to identify a button that is selected. A state where the button [1] situated on the left side has been selected is held as the initial state.

Next, drawing of a PNG is performed for each of button [1] and button [2] using "Draw", which is a drawing function. The button [1] is drawn as a PNG image "1black.png" with coordinates (10, 200) as the origin (upper left end). The button [2] is drawn as a PNG image "2white.png" with coordinates (330, 200) as the origin (upper left end).

At the end of this cell, the program to the right side in FIG. 25 is executed using a time event. A Link function is used here to instruct playing again from the beginning of this cell.

FIG. 26 is a diagram illustrating an example of a program in an event handler according to a user event for selection of a menu. In a case where any one of the remote controller keys of the "left" key, "right" key, or "OK" key has been pressed, the corresponding program is written in the event handler. In a case where the user has pressed a remote controller key, a user event is generated as described with reference to FIG. 21, and the event handler illustrated in FIG. 26 is activated.

The following branching processing is performed by this event handler, using the value of GPRM(0) identifying the selected button, and SPRM(8) identifying the selected remote controller key.

Condition 1) Case where button[1] is selected, and the selected key is "right" key GPRM(0) is reset to 2, and the button in the selected state is changed to the button[2] at the right.

The images of each of button[1] and button[2] are rewritten.

Condition 2) Case where the selected key is "OK" key, and button[1] is selected

Playback of playlist#2 is started.

Condition 3) Case where the selected key is "OK" key, and button[2] is selected

Playback of playlist#3 is started.

The program illustrated in FIG. 26 is interpreted and executed as described above.

Player Processing Flow

Figure 27:
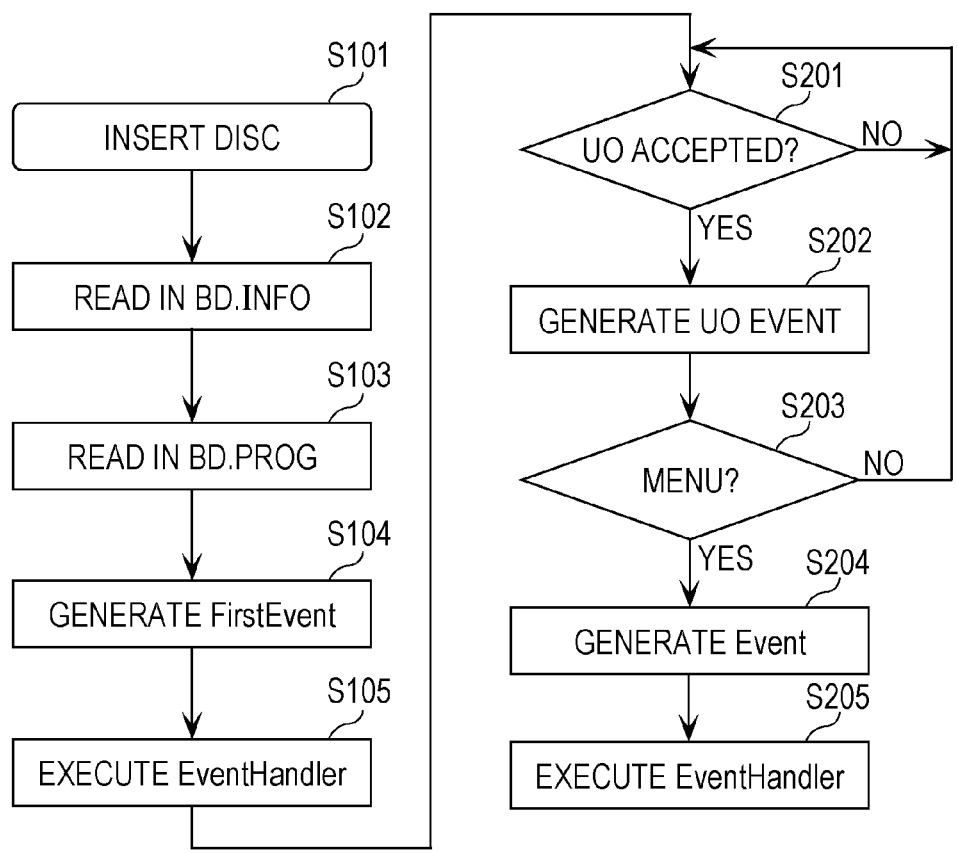
FIG. 27 is a flowchart illustrating the flow of basic processing for playback of AV data in a BD-ROM player.

The flow of processing at the player will be described with reference to FIGS. 27 through 30. FIG. 27 is a flowchart illustrating the basic flow of playback of AV data in a BD-ROM player.

Upon a BD-ROM being inserted (S101), the BD-ROM player reads in and analyzes "BD.INFO" (S102), and reads in "BD.PROG" (S103). "BD.INFO" and "BD.PROG" are both temporarily stored in the management information recording memory 204, and analyzed by the scenario processor 305.

Next, the scenario processor 305 generates the first event, in accordance with the first event (FirstEvent) information in the "BD.INFO" file (S104). The generated first event is received by the program processor 302, which executes the event handler corresponding to this event (S105).

It is expected that the event handler corresponding to the first event will have recorded therein information specifying a playlist to play first. If no playlist to play first is instructed, the player has nothing to play, and simply awaits a user event to accept (No in S201).

Upon receiving a remote controller operation from the user (Yes in S201), the UO manager 303 generates a UO event for the program processor 302 (S202).

The program processor 302 determines whether or not the UO event is due to the menu key (S203), and in the case of the menu key (Yes in S203), hands the UO event to the scenario processor 305, and the scenario processor 305 generates a user event (S204). The program processor 302 executes the event handler corresponding to the generated user event (S205).

Figure 28:
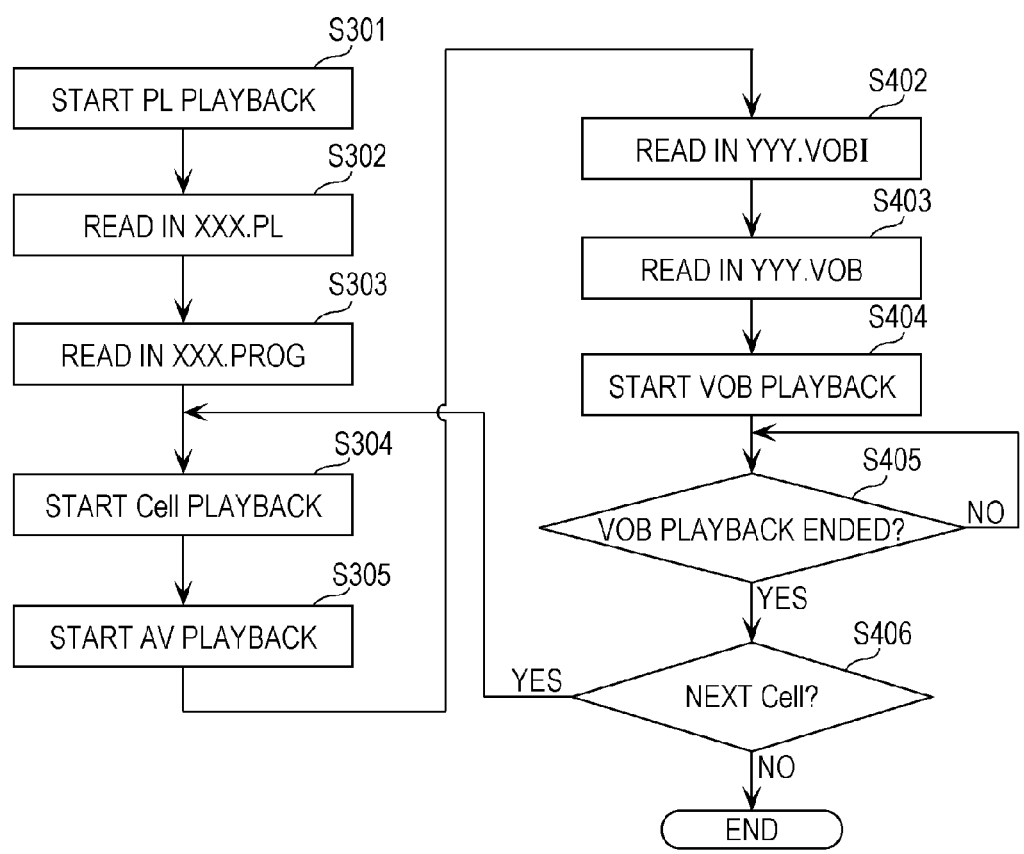
FIG. 28 is a flowchart illustrating the flow of processing in a BD-ROM player from starting to play a playlist until ending playing of the VOB.

FIG. 28 is a flowchart illustrating the flow of processing in a BD-ROM player from starting to play a playlist until ending the VOB. As described earlier, playback of a playlist is started by the first event handler or global event handler (S301). The scenario processor 305 reads in and analyzes the playlist "XXX.PL" as necessary information to play a playlist that is the object of playback (S302), and reads in the program information "XXX.PROG" corresponding to the playlist (S303).

Next, the scenario processor 305 starts playback of the cell, based on the cell information registered in the playlist (S304). Cell playback means that a request is issued from the scenario processor to the presentation controller 306, and the presentation controller 306 starts AV data playback (S305).

Once playback of AV data is started, the presentation controller 306 reads in the VOB information file "XXX.VOBI" corresponding to the cell being played (S402) and analyzes it. The presentation controller 306 identifies the VOBU for which to start playback and the address thereof, using the time map, and instructs the drive controller 317 of the readout address. The drive controller 317 reads out the relevant VOB data "YYY.VOB" (S403).

The VOB data that has been read out is sent to the decoder, and playback is started (S404). VOB playback is continued until the playback section of this VOB ends (S405), and upon ending, if there is a next cell (Yes in S406), transitions to playback of Cell (S304). In a case where there is no next cell (No in S406), the processing relating to playback ends.

FIGS. 29A and 29B are flowcharts illustrating the flow of event processing from after having started AV data playback. FIG. 29A is a flowchart illustrating the flow of processing relating to a time event in a BD-ROM player.

Note that the BD-ROM player is an event-driven player model. When playback of a playlist is started, the time event related, user event related, and subtitle display related event processing processes are each activated, and event processing is executed in parallel.

When playback of the playlist is started at the BD-ROM player (S501), confirmation is made that playlist playback has not ended (No in S502), and the scenario processor 305 confirms whether the time event generation time has arrived (S503).

In a case where the time event generation time has arrived (Yes in S503), the scenario processor 305 generates a time event (S504). The program processor 302 receives the time event, and executes the event handler (S505).

In a case where the time event generation time has not arrived (No in S503), and in a case where execution of the event handler has ended, the processing after confirmation of end of the playlist playback (S502) is repeated.

In a case where confirmation is made that the playlist playback has ended (Yes in S502), the time event related processing is force-quit.

FIG. 29B is a flowchart illustrating the flow of processing relating to a user event in a BD-ROM player. When playback of the playlist is started at the BD-ROM player (S601), confirmation is made that playlist playback has not ended (No in S602), and the UO manager 303 confirms whether a UO has been accepted.

In a case where there has been a UO accepted (Yes in S603), the UO manager 303 generates a UO event (S604). The program processor 302 accepts the UO event, and confirms whether the UO event is a menu call or not.

In the case of a menu call (Yes in S605), the program processor 302 causes the scenario processor 305 to generate an event (S607), and the program processor 302 executes the event handler (S608).

On the other hand, in a case where determination is made that the UO event is not a menu call (No in S605), this means that the UO event is an event due to a cursor key or the "OK" key. In this case, the scenario processor 305 determines whether or not the current time is within the valid period of the user event. If within the valid period (Yes in S606) the scenario processor 305 generates a user event (S607), and the program processor 302 executes the relevant event handler (S608).

In a case where there is no UO accepted (No in S603), the current time is not within the valid period of the user event (No in S606), or the execution of the event handler has ended, the processing following confirmation of the end of the playlist playback (S602) is repeated.

Upon confirmation of the end of the playlist playback (Yes in S602), the user event related processing is force-quit.

FIG. 30 is a flowchart illustrating the flow of processing of subtitle data in the BD-ROM player. When playback of the playlist is started at the BD-ROM player, confirmation is made that playlist playback has not ended (No in S702), and the scenario processor 305 confirms whether the subtitle display start time has arrived or not. In a case where the subtitle display start time has arrived (Yes in S703), the scenario processor 305 instructs the presentation controller 306 to draw the subtitle, and the presentation controller 306 instructs the image processor 311 to draw the subtitle. The image processor 311 follows the instruction to draw the subtitle on the image plane 209 (S704).

Also, in a case where the subtitle display start time has not arrived (No in S703), confirmation is made whether the subtitle display end time has arrived. In a case where the subtitle display end time has arrived (Yes in S705), the presentation controller 306 instructs the image processor 311 to erase the subtitle.

The image processor 311 erases the subtitle that has been drawn from the image plane 209, in accordance with the instruction (S706).

In a case where the subtitle drawing by the image processor 311 (S704) has ended, a case where erasing of the subtitle by the image processor 311 (S706) has ended, and a case where determination is made that the subtitle display end time has not arrived (No in S705), the processing following configuration of end of the playlist playback (S702) is repeated.

Also, upon confirmation of the end of the playlist playback (Yes in S702), the subtitle related processing is force-quit.

According to the above operations, the BD-ROM player performs basic processing relating to BD-ROM playback based on user instructions or the BD management information recorded in the BD-ROM, and so forth.

Second Embodiment

Next, a second embodiment of the present disclosure will be described. The second embodiment relates to recording, playing, and editing high luminance (HDR) video information using a Blue-ray Disc. Note that this basically is based on the first embodiment, so description will center on extended or different portions.

Figure 31:
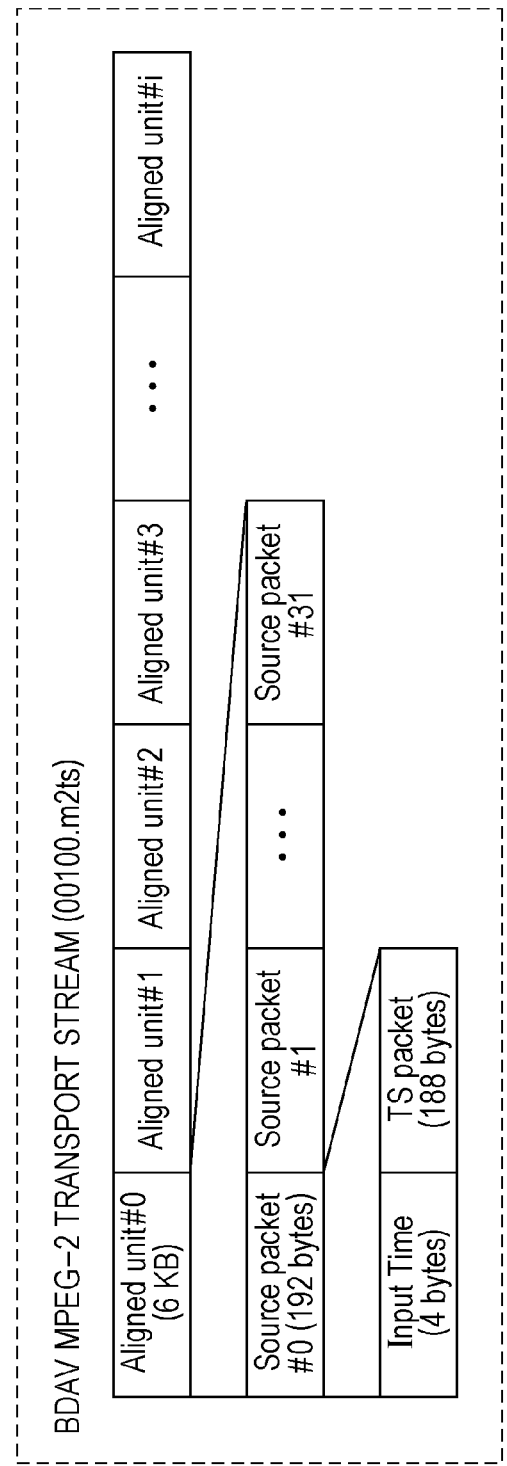
FIG. 31 is a diagram for describing a recording format of a system stream, used in Blu-ray (a registered trademark, the same hereinafter)

FIG. 31 diagram for describing a recording format of a system stream, used in Blu-ray Disc. Each MPEG-2 transport packet (TS packet) is imparted with Input Time where the relative input clock time of that TS packet has been input to the T-STD (system target decoder), in 27-MHz clock time precision, thereby making up of source packet of a total of 192 bytes. The system stream file is made up of multiple source packets. A data unit where 32 such source packets have been collected is called an Aligned unit, the size of an Aligned unit being 6 KB (32×192 bytes). Stream data made up of an integer number of Aligned units is recorded in a disc as a file (system stream file) having an .m2ts suffix. A file having such an .m2ts suffix is called an m2ts file, the recording format thereof is called the m2ts format, and us used in the current Blue-ray Disc.

Figure 32:
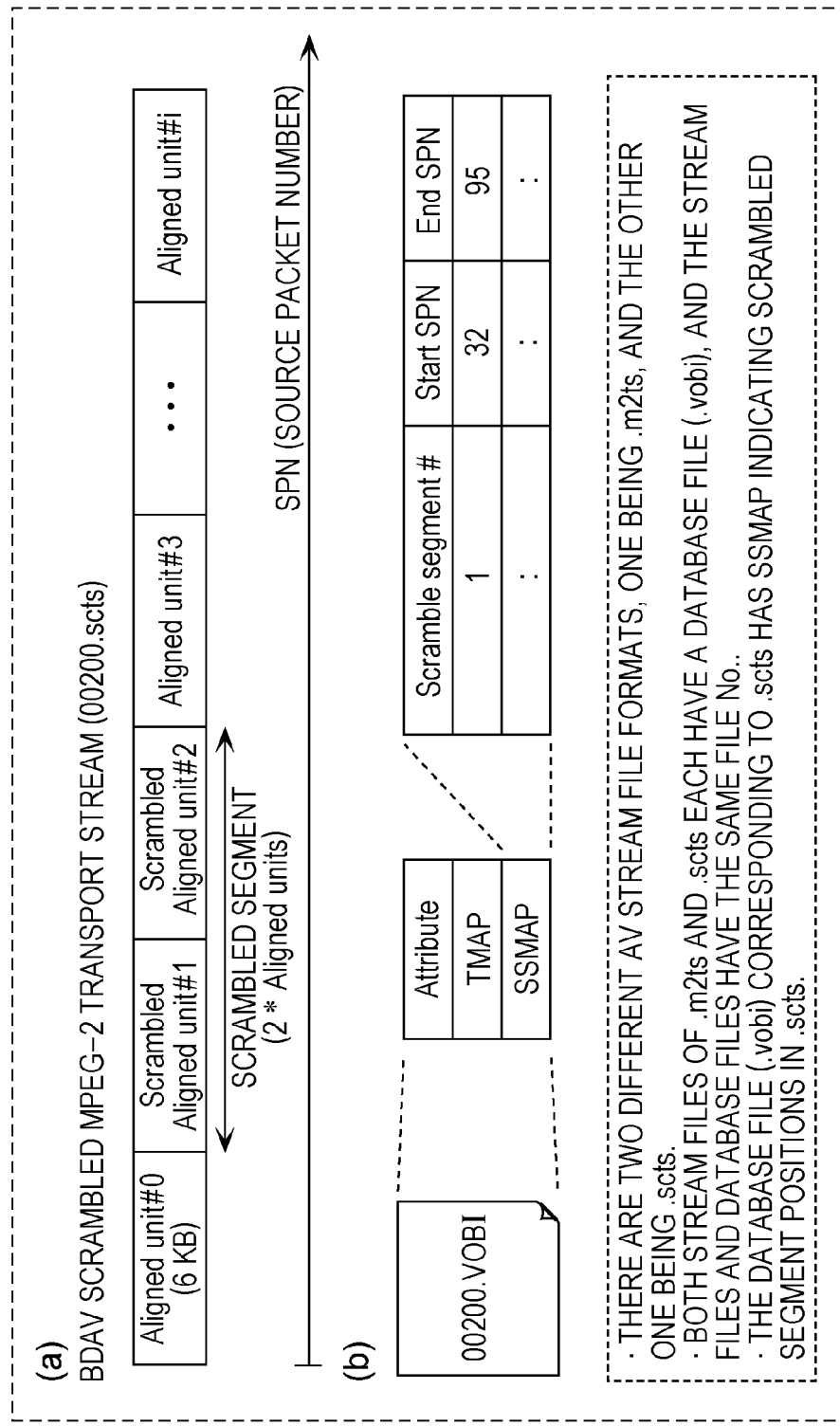
FIG. 32 is a diagram for describing a recording format of a system stream subjected to new encryption processing.

FIG. 32 is a diagram for describing a recording format of a system stream file subjected to new encryption processing. Specifically, (a) in FIG. 32 is a diagram illustrating the configuration of a system stream file subjected to the new encryption processing. Also, (b) in FIG. 32 is a diagram for describing a VOBI file corresponding to the new system stream file.

As illustrated in (a) in FIG. 32, the system stream file subjected to the new encryption processing (hereinafter referred to as "new system stream file") is the same as an m2ts file with regard to the point of being configured of an integer number of Aligned units, but differs regarding the point of including a scrambled segment configured of an even number of Aligned units at a partial segment. That is to say, the new system stream file includes video information subjected to encryption processing that is different from an m2ts file. That is to say, the new stream file has a scrambled segment as a first segment, and a segment other than the scrambled segment as the second segment (hereinafter referred to as "non-scrambled segment").

Also, in the new system stream file, one or the other of odd-numbered and even-numbered Aligned units of two Aligned units in the scrambled segment can be decrypted in accordance with a first decryption key that the player has, and the other Aligned unit cannot be correctly decrypted. Accordingly, in a case where decryption processing is performed, the other Aligned unit is converted into 6 KB of trash data. That is to say, the scrambled segment (first segment) has repeated therein an Aligned unit as the first data unit which the player (playback device) can decrypt using the first decryption key individually held, and an Aligned unit as the second data unit of the same data size as the first data unit, that cannot be decrypted by the first decryption key. Each Aligned unit is made up of 32 source packets, so the first data unit and the second data unit are made up of 32 source packets.

In the non-scrambled segment, the new system stream file is encrypted by a single decryption key in the same way as an m2ts file. That is to say, the non-scrambled segment (second segment) is a segment that can be all decrypted using a second decryption key held in common with another player.

The new system stream file of this new recording format is given a suffix ".scts" for example, and is called an scts file, indicating by the ".scts" suffix that this is a file of a recording format different from an m2ts file. Note that in an scts file, a VOBI file corresponding to this scts file can be identified by the numbers in the file name, in the same way as with an m2ts file.

At which location of the scts file the scrambled segment is situated (e.g., the placement location of the scrambled segment in the scts file) is specified in extended data (SSMAP) of the corresponding VOBI file, as illustrated in (b) in FIG. 32. An SSMAP is a data block that manages, for each scrambled segment, the start source packet No. (start SPN) and end source packet No. (End SPN) of that scrambled segment. Thus, the player can identify the placement positions of scrambled segments in scts files, at source packet precision. Note that information regarding which of the odd-numbered or even-numbered Aligned unit in the scrambled segment can be decrypted is handed to the player separately as encryption information, but this will not be described in detail here.

A player compatible with playing scts format files acquires the first decryption key necessary for decryption of either an odd-numbered or even-numbered Aligned unit at the time of decrypting an Aligned unit in a scrambled segment, succeeds in decryption of this Aligned unit, and fails in decryption of the other Aligned unit and generates 6 KB worth of trash data. At the time of decrypting an Aligned unit in a non-scrambled segment, the player succeeds in decryption by using a second decryption key that is different from the first decryption key for decryption of the Aligned unit in the scrambled segment, and continues playback. That is to say, the player fails in decryption of one or the other of the odd-numbered and even-numbered Aligned unit in each scrambled segment, and generates stream data that cannot be played in decryption of an scts file. The player can correctly decrypt and play stream data (Aligned unit) in non-scrambled segments in scts files.

A player playing a stream subjected to such encryption processing will perform decryption by switching between the first decryption key and second decryption key each time a boundary between a scrambled segment and a non-scrambled segment is crossed. Accordingly, the player needs overhead for switching decryption keys, and playback performance deteriorates. Also, stream data (Aligned unit) that cannot be played due to failing in decryption is generated during playback, necessity processing to discard this stream data. However, in a case where encryption further has been performed that necessitates address calculation using information relating to data size, such as a predetermined number of packets, to perform decryption successfully, like destroying multiplexed packet data of a predetermined number of packets from a particular packet, the processing of discarding packets will result in error in the address calculation. Accordingly, in such cases, simply discarding the Aligned unit regarding which decryption has failed is not sufficient to play the stream data. Further, such processing in packet increments cannot in any way be handled by software processing since the next-generation Blu-ray Disc and the like handle streams with extremely high rates (maximum of approximately 128 Mbps), so it is understood that the processing will be performed by hardware. The resultant increase in developing cost of the player is a further problem.

Figure 33:
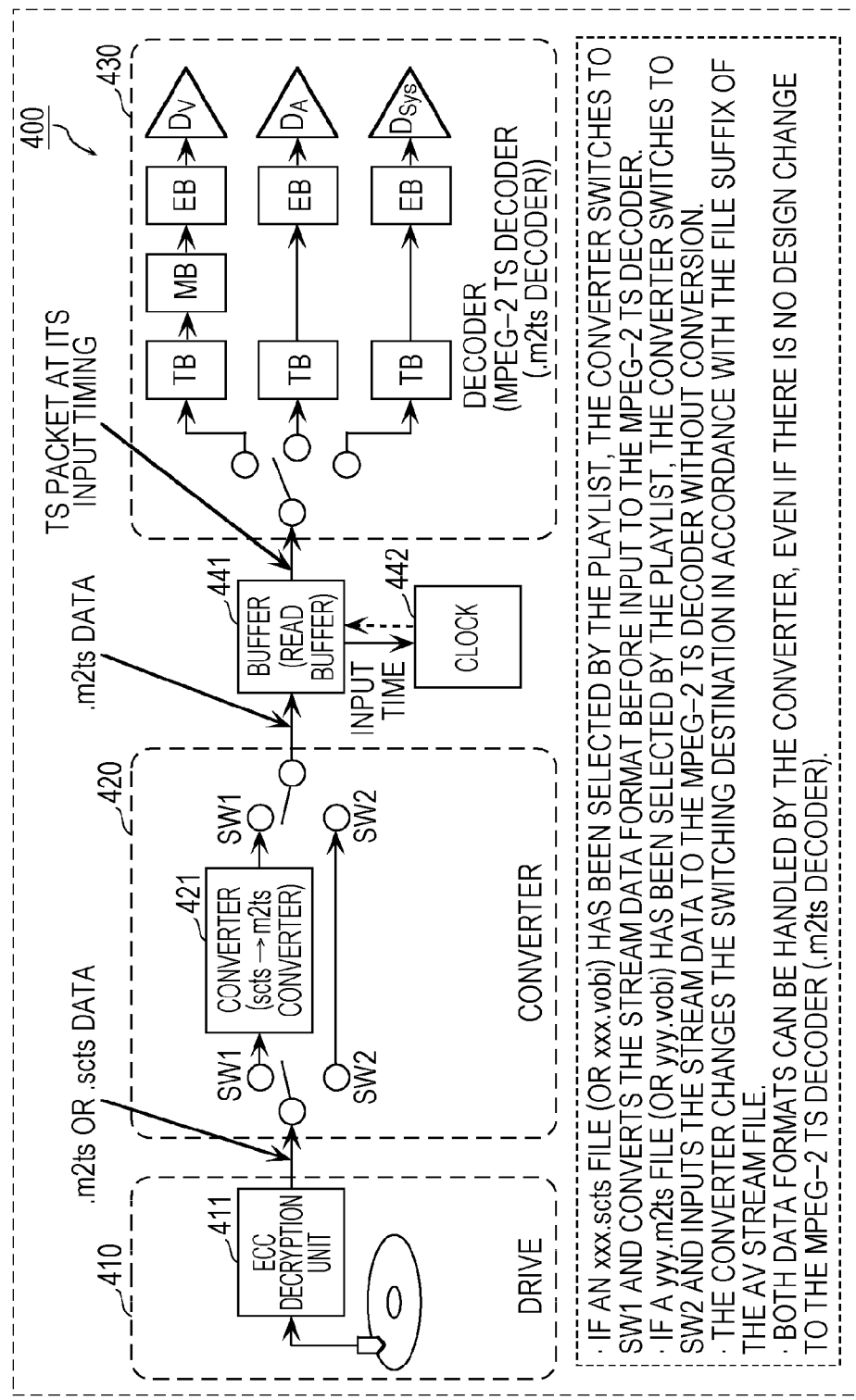
FIG. 33 is a diagram for describing a system configuration of a new player.

FIG. 33 is a diagram for describing the system configuration of a new player to handle such problems. A player 400 has a drive 410, a converter 420, a decoder 430, a buffer 441, and a clock 442, as illustrated in FIG. 33.

The drive 410 reads a system stream file including stream data out from a disc, and performs elliptic curve cryptography (ECC) decryption by way of an ECC decryption unit 411. That is to say, the drive 410 functions as a read unit. The drive 410 is a front-end configuration that is surrounded by a dashed line and labeled Drive in FIG. 33, and performs the above processing. Note that the drive 410 is a component regarding which there is no change from a conventional player.

The decoder 430 plays the stream data that has been read in, at the final stage of the player. The decoder 430 is a T-STD model decoder that conforms to the MPEG-2 System standard, and is configured including buffer series and decoders that process each of video, audio, and system data, in the same way as heretofore. The decoder 430 is a back-end configuration that is surrounded by a dashed line and labeled MPEG-2 TS Decoder (.m2ts decoder) in FIG. 33, and performs the above processing. Note that the decoder 430 is a component regarding which there is no change from a conventional player.

The player 400 has a buffer (Read Buffer) 441 and clock (Clock) 442 immediately upstream of the decoder 430 in the flow of data, to temporarily store data read in from the drive 410, and to input the TS packets to the decoder 430 at desired timing (Input Time) for the TS packets, without playback stopping when reading at the drive 410 stops (data reading substantially stopping due to switching of recording layers to be read). The buffer 441 and clock 442 also are components regarding which there is no change from a conventional player.

The component that the player 400 handling scts files newly has in order to avoid the problems described in FIG. 32 is the converter 420 that is surrounded by a dashed line and labeled Converter in FIG. 33. This converter 420 has switches to switch over depending on whether the file suffix made up of the stream data being read in is m2ts or scts. While reading in an m2ts file, the switches of the converter 420 are connected to SW2, and no change is made to the stream data output from the drive 410. On the other hand, when reading in an scts file, the switches of the converter 420 are connected to SW1, and operate so that the scts format file passes through the converter (scts→m2ts converter) 421 that converts into an m2ts format file. That is to say, determination is made regarding whether the system stream file is an m2ts file or an scts file, in accordance with whether or not the suffix of the system stream file that has been read out is m2ts. In a case where the system stream file that has been read out is determined to be an scts file, an m2ts format system stream obtained by performing the conversion processing is output, and in a case where the system stream file that has been read out is determined to be an m2ts file, the m2ts format system stream is output without performing the conversion processing.

Accordingly, while reading in an scts file, the converter 420 forms the stream data input m2ts format stream data and outputs, so the downstream decoder (MPEG-2 TS Decoder (.m2ts decoder)) can operate in the same way as when playing an m2ts format system stream, and the conventional decoder can be reused as it is. That is to say, in a case of the drive 410 having read out a system stream file having at least one of an scts file (first system stream file) and an m2ts file (second system stream file) the converter 420 outputs an m2ts format system stream regardless of which system stream file is read out, so both data formats can be handled without changing the design of the decoder decoding the m2ts file that is the same as the conventional.

Which of an m2ts format and scts format system stream file is being played can be identified by acquiring, from the No. of the VOBI file that the PlayList being played references, the suffix of the system stream file having the same No. That is to say, the converter 420 may determine whether or not to perform processing to convert the format of the system stream file in accordance with the suffix of the system stream file being played (being read by the drive 410), and switch to SW2 where nothing is converted in a case where the suffix of this system stream file is m2ts but switch to SW1 where the format of this system stream file is converted in a case where the suffix of this system stream file is scts.

Note that the switches may be switched to SW1 only during playback of an scts, and convert to an m2ts format system stream. Specifically, The converter 4250 can acquire the start position and end position of the scrambled segment by referencing the SSMAP in the VOBI file. Accordingly, the converter 420 may identify whether or not a scrambled segment in accordance with the start position and end position of the acquired scrambled segment, switch the switches to SW1 in a case where stream data in an identified scrambled segment, and switch the switches to SW2 in a case where not in the acquired scrambled segment.

Although the above described method may be used it identify whether the file format of the system stream file is the m2ts format or scts format, identification information may be recorded in the PlayList or VOBI file to explicitly identify which recording format is to be played, and which file format the file format being determined in accordance with this identification information.

Note that the converter 420 has been disposed between the ECC decryption unit 411 (drive 410) and buffer 441 since it is conceivable that time lag will occur due to switching of decryption keys and the like, but if the processing at the converter 420 is performed instantaneously in this model, the converter 420 may be situated between the buffer 441 and decoder 430.

Figure 34:
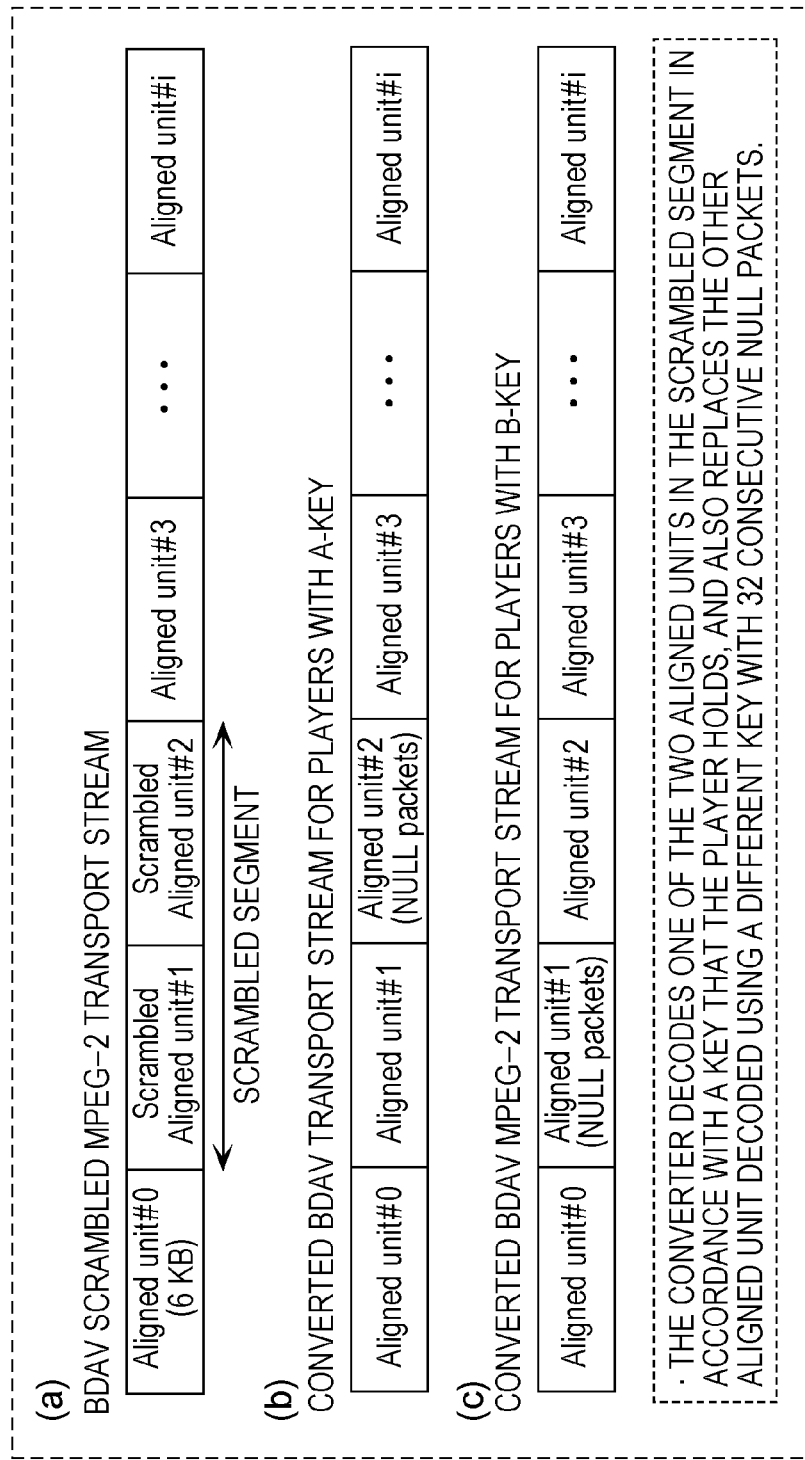
FIG. 34 is a diagram illustrating an example of a converter converting an scts file into an m2ts file.

FIG. 34 is a diagram illustrating an example of converting an scts file into an m2ts format system stream by the converter described in FIG. 33. Specifically, (a) in FIG. 34 is a diagram illustrating the configuration of a system file that has been subjected to the new encryption processing, (b) in FIG. 34 is a diagram illustrating the configuration of a system stream of which the file format has been converted by a player having a decryption key A (A-Key), and (c) in FIG. 34 is a diagram illustrating the configuration of a system stream of which the file format has been converted by a player having a decryption key B (B-Key).

In a case of playing an scts file such as illustrated in (a) in FIG. 34, the player 400 separately acquires, as part of encryption information, information indicating which route to select of a route of decrypting even-numbered Aligned units and a route of decrypting odd-numbered Aligned units in a scrambled segment, in accordance with the player. The player 400 decrypts one of the Aligned units using the acquired first decryption key, and generates 32 consecutive NULL packets for the other Aligned unit that cannot be decrypted with the first decryption key.

In a case of a player that has the A-type decryption key A as the first decryption key for example, the processing the converter 420 is processing where the Aligned unit #1 such as illustrated in (b) in FIG. 34 is decrypted, while the Aligned unit #2 cannot be decrypted and the Aligned unit #2 is replaced by 32 consecutive NULL packets.

Conversely, in a case of a player that has the B-type decryption key B as the first decryption key, the processing at the converter 420 is processing where the Aligned unit #1 such as illustrated in (c) in FIG. 34 cannot be decrypted and the Aligned unit #1 is replaced by 32 consecutive NULL packets, while the Aligned unit #2 is correctly decrypted.

It is important that stream data that has passed through the converter 420 is m2ts format, for both a player having the decryption key A and a player having the decryption key B. That is to say, conversion processing is performed where the 32 source packets making up the other Aligned unit (second data unit) in the system stream file that has been read out, that cannot be decrypted in the scrambled segment (first segment), are converted into a system stream where the 32 source packets are converted into 32 NULL packets that are multiple consecutive invalid packets, and the post-conversion system stream is output. Thus, reusability of the decoder can be guaranteed by m2ts format system streams always being output toward the decoder. Note that is the conversion processing, the system stream file is converted into an m2ts format system stream by decrypting the scrambled segment (first segment) using the first decryption key, and decrypting the non-scrambled segment (second segment) using the second decryption key.

Also, processing is performed to replace the Aligned unit that cannot be decrypted with NULL packets of the same size and same number as the multiple source packets making up the Aligned unit, so the 32 source packets are replaced by the same 32 NULL packets. Accordingly, the positions of the multiple source packets making up the first data unit that can be decrypted, can be situated at the same positions before and after conversion processing. Thus, there is no need for increase/decrease in the number of packets, even for a stream subjected to encryption processing necessity address calculation such as described toward the end of the description of FIG. 32. Accordingly, the decoder 430 can be made to operate properly the same as heretofore, and the post-conversion processing system stream can be played without recalculating addresses, so the processing load can be reduced. Note that the processing of the converter 420 can be designed to be situated at any position as long as between the drive 410 and the decoder 430.

Figure 35:
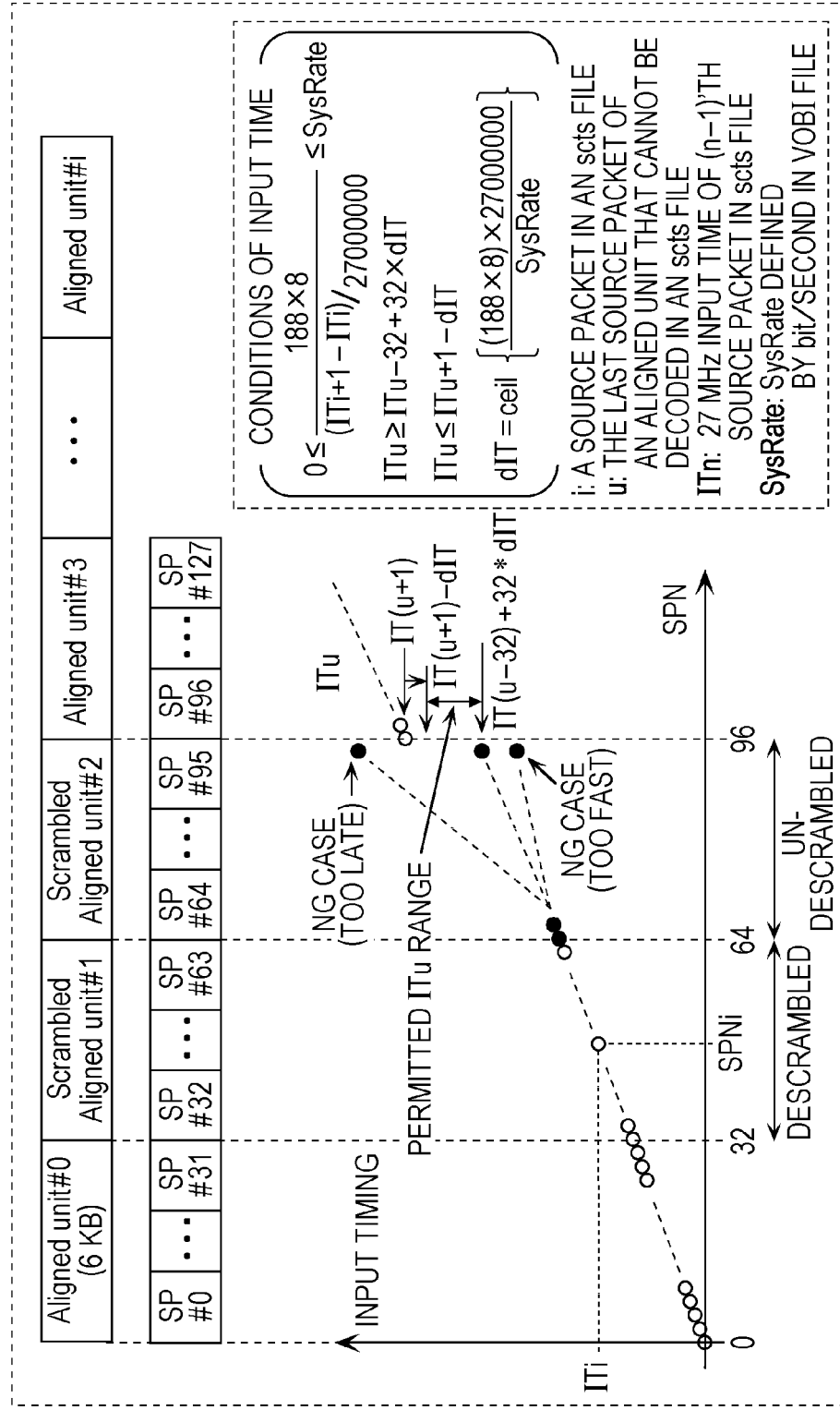
FIG. 35 is a diagram for describing the value of Input Time imparted to each NULL packet at the time of replacing data of an Aligned unit that cannot be decrypted with 32 consecutive NULL packets.

FIG. 35 is a diagram for describing the value of Input Time imparted to each NULL packet at the time of replacing the data of the Aligned unit that cannot be decrypted with 32 consecutive NULL packets.

Of the two Aligned units in a scrambled segment within an scts file, the 32 NULL packets corresponding to the Aligned unit that cannot be decrypted (Aligned unit #2) must also be able to be suitably processed at the decoder 430 situated downstream from the converter 420. In the T-STD model, NULL packets do not need buffer management since they are discarded immediately after packet ID (PID) filtering, but the transfer rate of the NULL packets must never exceed the maximum transfer rate (the value listed in FIG. 13 in bit/second units in the SysRate of the VOBI file) of the system stream file (NG (short for "no good", meaning "unacceptable" through the present specification and attached drawings) case (too fast) in FIG. 35), nor the Input Time of the TS packet immediately after transferring the 32 NULL packets point to the past (NG case (too late) in FIG. 35). Accordingly, a suitable Input Time (a timestamp indicating the input clock time to the system target decoder) is imparted to each of the 32 NULL packets in the conversion processing.

$IT_i$ indicates Input Time of a source packet of $SPN_i$, the suffix i indicating any one source packet within the scts file, and the suffix u indicating a source packet generated at the end of the Aligned unit that cannot be decrypted (in the example in FIG. 35, the 96'th source packet (SP#95) from the start of the scts file, etc.). In a case where the SysRate indicates the maximum peak rate (bit/second) of this MPEG-2 transport stream, the Input Time imparted to each NULL packet at the time of replacing the data of the Aligned unit that cannot be decrypted with 32 consecutive NULL packets needs to satisfy the following Conditions (1) through (3).

Condition (1) is for the transfer rate of transferring any source packet to satisfy 0 or higher and SysRate or lower. That is to say, a time stamp is imparted to each of the 32 NULL packets in the conversion processing satisfying that the transfer rate for transferring the NULL packets is equal to or smaller than the maximum transfer rate of the system stream file. Note that Condition (1) is expressed as in Expressions (3) and (4).

$$0 \leq \frac{188 \times 8}{(IT_{i+1} - IT_i)/27000000} \leq SysRate \text{ [bit/sec]} \quad \text{Expression (3)}$$

Condition (2) is for the Input Time (IT (u)) of the last source packet of the 32 NULL packets generated as corresponding data for the Aligned units that cannot be decrypted to satisfy a time that is after a time equal to or greater than a time necessary to transfer the 32 TS packets at the SysRate, from the Input Time of the last source packet of the immediately-preceding Aligned unit (IT (u-32)). In a case where dIT is time necessary to transmit one TS packet at SysRate in 27 MHz units, and Ceil( ) is a function to round up after the decimal point, Condition (2) is expressed as in Expressions (4) and (5).

$$IT(u) \geq (u - 32) + 32 \times dIT \quad \text{Expression (4)}$$

$$dIT = ceil\left(\frac{(188 \times 8) \times 27000000}{SysRate}\right) \quad \text{Expression (5)}$$

Condition (3) is for the Input Time (IT (u)) of the last source packet of the 32 NULL packets generated as corresponding data for the Aligned units that cannot be decrypted to satisfy being smaller than the Input Time (IT (u+1)) of an immediately-following TS packet that can be decrypted, by an amount equivalent to dIT or smaller. That is to say, in the conversion processing, the last NULL packet of the 32 NULL packets that have replaced one Aligned unit that cannot be decrypted (second data unit) is imparted with a time stamp that satisfies a clock time that is earlier than the Input Time stored in the source packet immediately after the one Aligned unit that cannot be decrypted (i.e., the Input Time given to the TS packet immediately following the one Aligned unit that cannot be decrypted), by an amount of time necessary to transfer one TS packet at the maximum transfer rate of the system stream file or more.

$$IT(u) \leq IT(u+1) - dIT \quad \text{Expression (6)}$$

The converter 420 generates 32 consecutive NULL packets having Input Time satisfying these Conditions (1) through (3), and thereby can generate a system stream conforming to m2ts (MPEG-2 System). Accordingly, the decoder 430 (conforming to the T-STD model) can suitably continue decoding including places of Aligned units that cannot be decrypted.

Figure 36:
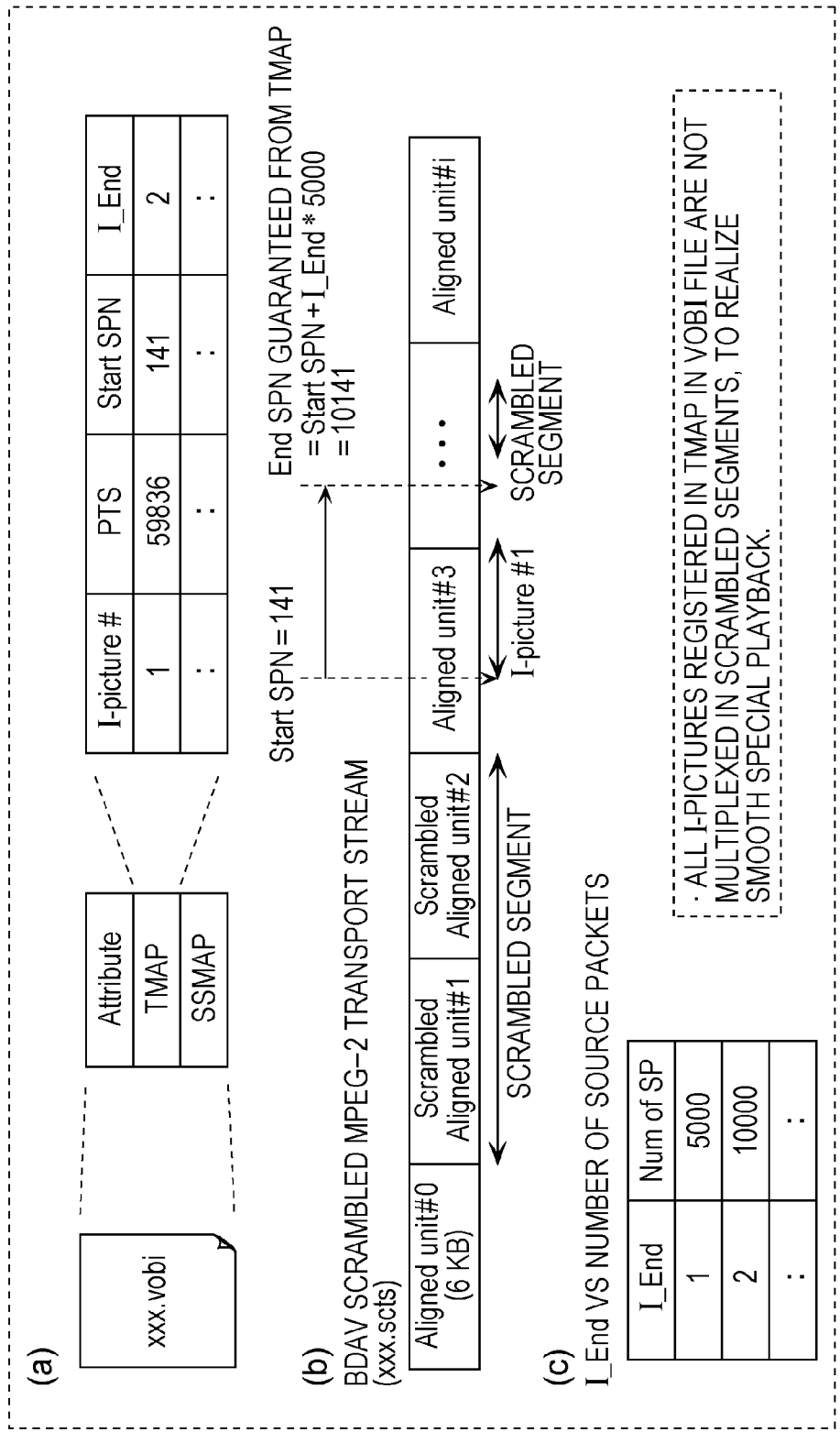
FIG. 36 is a diagram for describing multiplexing constraints to guarantee performance during special playback.

FIG. 36 is a diagram for describing multiplexing constraints for guaranteeing performance during special playback. In FIG. 36, (a) illustrates the TMAP of a VOBI file.

The TMAP of a VOBI file is corrected for an MPEG-2 transport stream, and includes a PTS for an I-picture serving as a random access point. That is to say, a VOBI file serving as a management information file corresponding to the system stream file has a time map indicating the PTS (presentation clock time) of an I-picture serving as a random access point. The TMAP also includes a start source packet No. (Start SPN) for the I-picture serving as a random access point. That is to say, this TMAP is further correlated with a Start SPN identifying the start source packet of the multiple source packets where the I-picture is stored. This TMAP further includes end position information (I_End) representing the distance to the multiplexing end source packet of the I-picture serving as a random access point as a level in several steps (to reduce the size of the TAMP). That is to say, this TMAP further is correlated with I_End that represents, in a stepwise manner, the number of packets regarding which inclusion of multiple source packets storing the I-picture is guaranteed, which is the number of packets from the start packet.

In FIG. 36, (c) illustrates an example of each value of I_End, and how many source packets the value of this I_End specifically corresponds to. That is to say, (c) in FIG. 36 is a diagram illustrating the relationship between I_End and source packet No. The actual I-picture multiplexing packet count is allocated in a stepwise manner in increments of 5000 packets, in accordance with the value of I_End, as illustrated in (c) in FIG. 36. Although description is made where I_End and the source packet count are correlated such that the number of source packets increases in 5000 packet increments each time the I_End increases by 1, the increase does not have to be in 5000 packet increments, and increase may be in increments of other packet counts. Also, it is sufficient that the number of source packets is allocated so as to increase each time I_End increases by 1, and does not have to be increased by a fixed predetermined number of packets.

In FIG. 36, (b) illustrates where the I-picture #1 is recorded in the scts file, using Start SPN and I_End of the TMAP. That is to say, (b) in FIG. 36 is a diagram illustrating the position where the I-picture #1 is in the scts file, indicated by Start SPN and I_End in the TMAP. Note that while the Start SPN accurately indicates the start source packet of the I-picture, the I_End is expressed in increments of 5000 packets, and accordingly points to behind the multiplexing end position of the actual I-picture #1.

Thus, the multiplexing position of the I-picture in the scts file can be obtained from the TMAP, but if the I-picture registered in the TAMP is multiplexed spanning a scrambled segment, delay will occur in exchanging decryption keys when performing special playback (trick play) such as fast-forward and the like, and the special playback cannot be performed smoothly.

Accordingly, it is effective to multiplex I-pictures such as illustrated in FIG. 36, so that no scrambled segment occurs in multiplexing segments of all I-pictures registered in the TMAP of the VOBI file (segment from Start SPN to Start SPN+I_End*5000 for each I-picture entry), or to adjust scrambled segments accordingly. That is to say, no multiplexing is performed in scrambled segments for all I-pictures registered in the TMAP of the VOBI file, in order to realize smooth special playback. To further restate this, all I-pictures having a PTS indicated in the TMAP of the VOBI file are multiplexed in non-scrambled segments (second segment). More specifically, a start source packet making up an I-picture, that is identified by Start SPN, is situated in a non-scrambled segment (second segment). Also, the segment from this start source packet till a source packet situated after the final source packet making up the I-picture, identified by Start SPN and I_End, is situated in a non-scrambled segment (second segment).

Accordingly, the converter 420 can convert the system stream file into an m2ts format system stream by performing decryption of all I-pictures using the second decryption key. Thus, exchanging decryption keys can be avoided by configuring the scts file this way, and special playback response equal to that of an m2ts file can be realized.

FIG. 37 is a diagram for describing an additional embodiment in a case where the information recording medium is an optical disc, in further detail than in FIG. 36. The top tier is the structure of an scts file, exemplifying a scrambled segment and an I-picture multiplexing position. Although not described in FIG. 36, error correction is performed in ECC block increments with optical discs such as DVDs and Blu-ray Discs, to improve resistance to scratches and the like on the recording face. That is to say, system stream files are recorded on optical discs in increments of ECC blocks, as predetermined data units read out by the player (playback device) playing the AV data recorded in the optical disc.

The drive 410 can only access in increments of these ECC blocks, so just configuring the scts file such that scrambled segments and I-picture multiplexing positions specified in the TMAP do not overlap does not completely prevent the above-mentioned deterioration in special playback response.

(NG-1) in FIG. 37 is a diagram illustrating an example of a data structure that invites deterioration in special playback response, indicating the positional relationship between the scrambled segments and I-picture multiplexing position of the scts file shown in the top tier, and ECC blocks. Here, the end packet of a scrambled segment including Aligned unit #k−1, and a start packet of an I-picture (Start SPN) belong to the same ECC block (ECC #m). Accordingly, the player 400 starts to read in the Start SPN to start playing the I-picture during special playback, but the drive 410 performs reading processing in ECC increments, so in reality starts reading from the scrambled segment disposed immediately before the Aligned unit #k where this I-picture is included. As a result, delay occurs due to decryption key exchanging, and the response of the special playback deteriorates. In order to avert such a situation, a case such as in (NG-1) in FIG. 37 has to be avoided.

(NG-2) in FIG. 37 is a diagram illustrating another example of a data structure that invites deterioration in special playback response, indicating the positional relationship between the scrambled segments and I-picture multiplexing position of the scts file shown in the top tier, and ECC blocks. Here, the last multiplexed packet of the I-picture indicated by Start SPN+I_End*5000, and the start packet of a following scrambled segment, belong to the same ECC block (ECC #n). Accordingly, the player 400 reads in up to Start SPN+I_End*5000 to play this I-picture during special playback, but the drive performs reading processing in ECC increments, so in reality reads up to the scrambled segment situated after this Start SPN+I_End*5000. As a result, delay occurs due to decryption key exchanging, and the response of the special playback deteriorates. In order to avert such a situation, a case such as in (NG-2) in FIG. 37 has to be avoided.

In order to prevent cases such as (NG-1) in FIG. 37 and (NG-2) in FIG. 37, the following Conditions (1a) and (1b) need to be satisfied, in addition to satisfying the condition that no scrambled segment is situated in the multiplexing segments of all I-pictures registered in the TMAP, which is the constraint in FIG. 36.

Condition (1a) An ECC block including the start packet (Start SPN) of an I-picture registered in the TMAP shall not include a scrambled segment.

Condition (1b) An ECC block including the multiplexing end packet guarantee position (Start SPN+I_End*5000) of an I-picture registered in the TMAP shall not include a scrambled segment.

That is to say, the system file needs to be recorded in the optical disc in a state satisfying that an ECC block including the start source packet identified by Start SPN, and an ECC block including the source packet at the multiplexing end packet guarantee position identified by Start SPN and I_End, do not include part of all of a scrambled segment (first segment) i.e., in a state included only in a non-scrambled segment.

Alternatively, in a case where the optical disc to record the scts file in is a Blu-ray Disc, a data structure may be made that satisfies the following Conditions (2a) and (2b), since 1 ECC block=64 KB.

Condition (2a) The end packet in a scrambled segment situated immediately before the start packet (start SPN) of an I-picture registered in the TMAP satisfies Start SPN-342 or lower. Alternatively, the scrambled segment satisfies ending 64 KB or more earlier than the Start SPN.

Condition (2b) The start packet in a scrambled segment situated immediately after the multiplexing end packet guarantee position (Start SPN+I_End*5000) of an I-picture registered in the TMAP satisfies Start SPN+I_End*5000+342 or above. Alternatively, the scrambled segment satisfies starting 64 KB or more after the Start SPN+I_End*5000.

Now, 342 packets is 64 KB expressed in the number of source packets, and is the calculation results of 64*1024/192=341.333. . . .

Note that the above description is only exemplary, and that one skilled in the art can make various applications.

The present disclosure is useful as a playback method, a playback device, and recording medium and so forth, where implementation load and increase in cost of the player can be suppressed, even if a large-scale change where the very recording format of the stream differs is introduced to introduce powerful encryption technology.

What is claimed is:

1. A playback method used by a first playback device that plays a system stream file including encrypted video information,
the system stream file including
a first segment in which is repeated a first data unit that can be decrypted using a first decryption key that the first playback device individually has and a second data unit of the same data size as the first data unit but cannot be decrypted by the first decryption key, and
a second segment which can be decrypted using a second decryption key that the first playback device has in common with a second playback device,
the method comprising:
reading the system stream file;
performing conversion processing to convert the system stream file that has been read out into a post-conversion system stream, in which the second data unit in the first segment in the system stream file that has been read out is replaced with a plurality of continuous invalid packets; and
outputting the post-conversion system stream.

2. The method according to claim 1,
wherein the second data unit is configured of 32 source packets,
and wherein the 32 source packets configuring the second data unit are replaced by 32 NULL packets, serving as the plurality of invalid packets, in the conversion.

3. The method according to claim 1,
wherein the system stream file is converted into an m2ts format system stream in the conversion by decrypting the first segment using the first decryption key and decrypting the second segment using the second decryption key.

4. The method according to claim 3,
wherein the system stream file configures audio visual (AV) data along with a management information file recording management information corresponding to the system stream file,
the management information file has a time map indicating a presentation clock time of an I-picture that is a random access point,
all I-pictures regarding which the presentation clock time is indicated in the time map are multiplexed in the second segment, and
the system stream file is converted into an m2ts format system stream in the outputting, by decrypting all of the I-pictures using the second decryption key.

5. The playback method according to claim 1,
wherein the system stream file has at least one of a first system stream file having the first segment and the second segment, and a second system stream file of the m2ts format,
and wherein, in the outputting,
determination is made regarding whether the system stream file is the first system stream file or the second system stream file, in accordance with whether or not the suffix of the system stream file indicates the m2ts format,
an m2ts format system stream obtained by performing the conversion processing is output in a case where the system stream file that has been read out is determined to be the first system stream file, and a system stream is output without having performed the conversion processing in a case where the system stream file that has been read out is determined to be the second system stream file.

6. The method according to claim 1, wherein the system stream file is configured of a plurality of source packets, wherein each of the plurality of source packets has a first timestamp indicating an input clock time to a system target decoder than the first playback device has, and wherein a second timestamp indicating an input clock time to the system target decoder is imparted to each of the plurality of invalid packets in the conversion.

7. The method according to claim 6, wherein the second timestamp imparted to each of the plurality of invalid packets in the conversion processing satisfies that a transfer rate at which the invalid packets are transferred is equal to or smaller than the maximum transfer rate of the system stream file.

8. The method according to claim 6, wherein the second timestamp imparted to the invalid packet that is the last of the plurality of invalid packets replaced in the one second data unit satisfies a clock time earlier than the timestamp of a TS packet immediately following one second data unit by an amount of time necessary to transfer one TS packet at the maximum transfer rate of the system stream file.

9. A playback device that plays a system stream file including encrypted video information, the system stream file including a first segment in which is repeated a first data unit that can be decrypted using a first decryption key that the playback device individually has and a second data unit of the same data size as the first data unit but cannot be decrypted by the first decryption key, and a second segment which can be decrypted using a second decryption key that the playback device has in common with another playback device, the device comprising:

one or more memories and circuitry which, in operation, read the system stream file, and convert the system stream file that has been read out into a post-conversion system stream, in which the second data unit in the first segment in the system stream file that has been read out is replaced with a plurality of continuous invalid packets, and outputting the post-conversion system stream.

* * * * *